(12) United States Patent
Schimpe

(10) Patent No.: US 10,862,611 B2
(45) Date of Patent: Dec. 8, 2020

(54) WAVELENGTH SELECTIVE SWITCH AND RECONFIGURABLE OPTICAL ADD/DROP MULTIPLEXER

(71) Applicant: Xieon Networks S.à.r.l., Luxembourg (LU)

(72) Inventor: Robert Schimpe, Luxembourg (LU)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/463,694

(22) PCT Filed: Dec. 22, 2017

(86) PCT No.: PCT/EP2017/084294
§ 371 (c)(1),
(2) Date: May 23, 2019

(87) PCT Pub. No.: WO2018/122146
PCT Pub. Date: Jul. 5, 2018

(65) Prior Publication Data
US 2019/0327015 A1 Oct. 24, 2019

(30) Foreign Application Priority Data
Dec. 27, 2016 (EP) ..................................... 16206958

(51) Int. Cl.
*H04B 10/00* (2013.01)
*H04J 14/02* (2006.01)
(Continued)

(52) U.S. Cl.
CPC ...... *H04J 14/0212* (2013.01); *G02B 6/29305* (2013.01); *G02B 6/29382* (2013.01);
(Continued)

(58) Field of Classification Search
USPC ....................................................... 398/88–92
See application file for complete search history.

(56) References Cited

U.S. PATENT DOCUMENTS 5,917,625 A * 6/1999 Ogusu .................. G02B 6/2931
385/132
6,222,954 B1 * 4/2001 Riza ....................... G02B 6/266
385/18
(Continued)

FOREIGN PATENT DOCUMENTS

WO 2013185287 A1 12/2013
WO 2014141281 A1 9/2014

OTHER PUBLICATIONS

International Search Report and Written Opinion, PCT/EP2017/084294, dated Feb. 22, 2018, 12 pages.
(Continued)

*Primary Examiner* — Agustin Bello

(57) ABSTRACT

A wavelength selective switching device comprises a plurality of input paths for receiving optical signals, a plurality of output paths for emitting the optical signals, and a switching unit for selectively directing the optical signals from the input paths to the output paths. The switching unit comprises a reflective area adapted to be concurrently illuminated by a first optical signal from a first input path among the plurality of input paths, and by a second optical signal from a second input path among the plurality of input paths, the second input path being different from the first input path, and to concurrently direct the first optical signal to a first output path among the plurality of output paths and the second optical signal to a second output path among the plurality of output paths, the second output path being different from the first output path. Said first output path and
(Continued)

said second output path are spatially separated by said first input path and said second input path, or vice-versa.

17 Claims, 21 Drawing Sheets

(51) Int. Cl.
    *G02B 6/293* (2006.01)
    *G02B 6/35* (2006.01)
    *H04Q 11/00* (2006.01)

(52) U.S. Cl.
    CPC ....... *G02B 6/3512* (2013.01); *H04Q 11/0005* (2013.01); *H04Q 2011/0016* (2013.01)

(56) References Cited

U.S. PATENT DOCUMENTS

| | | | | |
|---|---|---|---|---|
| 6,535,664 B1 * | 3/2003 | Anderson | ............ | G02B 6/3546 |
| | | | | 385/16 |
| 6,542,657 B2 * | 4/2003 | Anderson | ............ | G02B 6/352 |
| | | | | 385/18 |
| 6,873,755 B2 * | 3/2005 | Anderson | ............ | G02B 6/3546 |
| | | | | 359/226.1 |
| RE42,124 E * | 2/2011 | Riza | ............ | G02B 6/266 |
| | | | | 385/140 |
| 8,089,683 B2 * | 1/2012 | Holmes | ............ | G02B 5/32 |
| | | | | 359/279 |
| 8,731,403 B2 * | 5/2014 | Martinelli | ............ | G02B 6/3512 |
| | | | | 398/49 |
| 8,797,638 B2 * | 8/2014 | Hotta | ............ | G02F 1/2955 |
| | | | | 359/245 |
| 10,180,616 B2 * | 1/2019 | Holmes | ............ | G02B 5/32 |
| 2001/0050787 A1 * | 12/2001 | Crossland | ............ | G02F 1/292 |
| | | | | 359/15 |
| 2002/0076137 A1 * | 6/2002 | Anderson | ............ | G02B 6/352 |
| | | | | 385/18 |
| 2002/0118411 A1 * | 8/2002 | Cooney | ............ | H04B 10/2503 |
| | | | | 398/41 |
| 2005/0041914 A1 * | 2/2005 | Anderson | ............ | G02B 6/352 |
| | | | | 385/18 |
| 2010/0202778 A1 | 8/2010 | Wisseman | | |
| 2010/0316385 A1 * | 12/2010 | Suzuki | ............ | G02B 6/12019 |
| | | | | 398/87 |
| 2019/0327015 A1 * | 10/2019 | Schimpe | ............ | H04J 14/0212 |

OTHER PUBLICATIONS

Communication pursuant to Article 94(3) EPC, dated Apr. 30, 2020, for European counterpart Application No. EP 17 818 117.2-1220 (Applicant Xieon Networks S.a.r.l.).

* cited by examiner

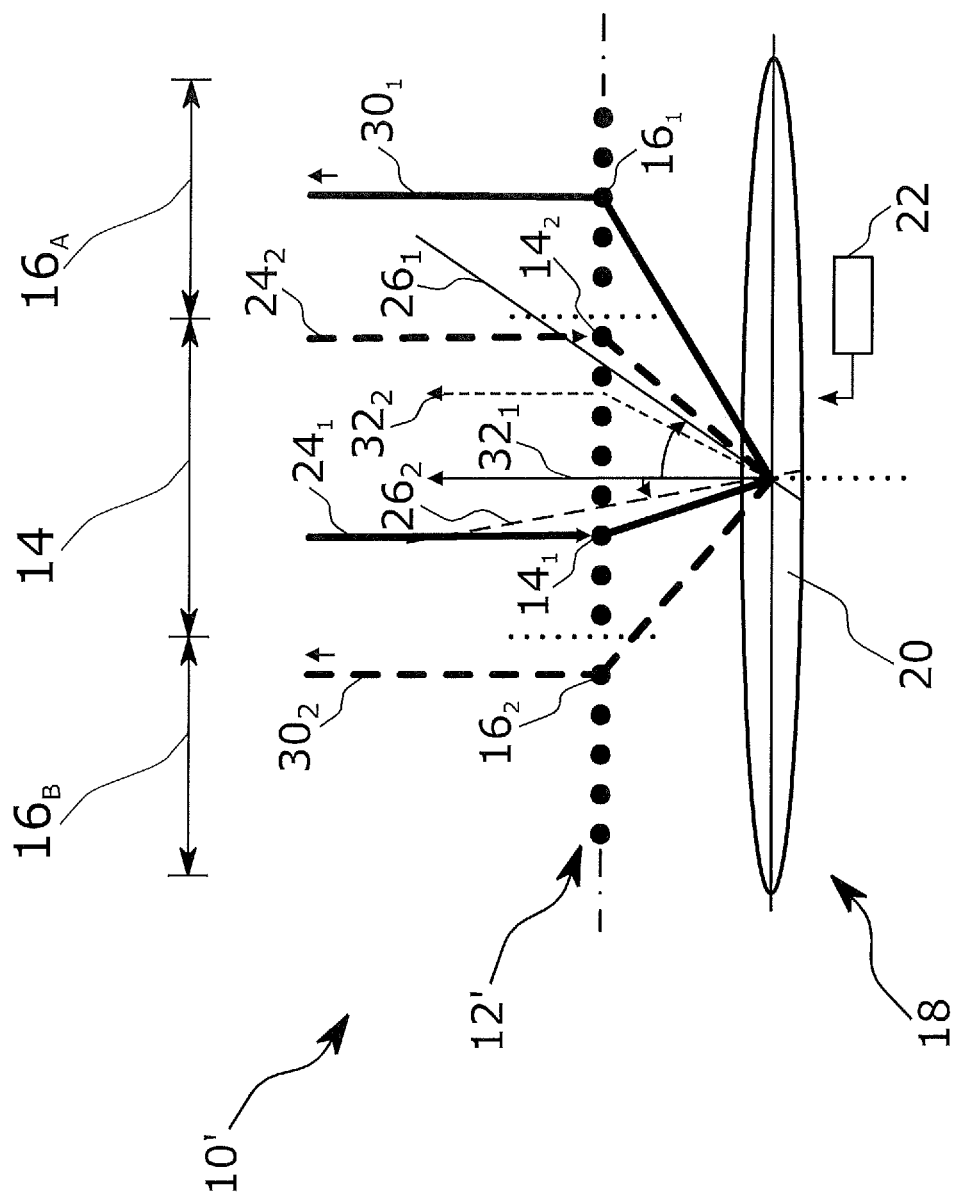

WAVELENGTH SELECTIVE SWITCH AND RECONFIGURABLE OPTICAL ADD/DROP MULTIPLEXER

RELATED APPLICATIONS

This application is a 35 U.S.C. 371 national stage filing of International Application No. PCT/EP2017/084294, filed on Dec. 22, 2017, which claims priority to European Patent Application No. 16206958.7, filed on Dec. 27, 2016. The entire contents of these applications are incorporated herein by reference in their entirety.

FIELD OF THE INVENTION

The invention relates to a wavelength selective switch (WSS) and a reconfigurable optical Add/Drop Multiplexer (ROADM), in particular for independent routing and optically attenuating of at least two optical channel sets with spectral overlap.

BACKGROUND

In a wavelength division multiplexed (WDM) optical network, optical signals encoded with streams of information are multiplexed to form a WDM signal. The WDM signal is transmitted through a series of optical fibers. At the egress point the optical signal are demultiplexed. The streams of information are retrieved by means of optical receivers.

Wavelength selective switches (WSS) may be employed in the optical transmission path to selectively receive optical signals from among a first plurality of optical fibers and to selectively transmit optical signals via a second plurality of optical fibers. Contentionfree routing of two channels in the same optical frequency band may require to cross connect two WSS groups.

Reconfigurable optical add/drop multiplexer structures (ROADM) typically comprise a plurality of wavelength selective switches and allow to route optical channels between express fiber ports and between express fiber ports and add/drop ports dynamically in response to varying data bandwidth requirements between various network nodes. A ROADM add/drop port should be capable to adapt the wavelength of add or drop channels without changing the port to which the transponder is connected (so-called "colorless ROADM add/drop port). An add/drop port should also allow to adapt the direction of add or drop paths without changing the port the transponder is connected to (so-called "directionless" ROADM add/drop port). Often a colorless and directionless add/drop port is part of a colorless and directionless add/drop port group, which can use each wavelength only once. This limitation can be caused by the wavelength contention of WSS used within the add/drop port group. Colorless directionless add/drop port groups with such wavelength contentioned WSS are described in further detail e.g. in F. Heismann et al., Optical Fiber Technology 17 (2011), pp. 503-511, and in US 2014/0255026 A1.

WSS-based ROADM structures exhibit a tradeoff between their nodal degree and the add/drop capacity. With an increasing nodal degree, the add/drop capacity is expected to grow, but in reality decreases because of the limited number of WSS ports available. This places challenges on the ability to build ROADM structures with a high number of input and output ports, in particular in dense wavelength division multiplexing (DWDM) scenarios in which independent routing of at least two channel sets with spectral overlap through a WSS with a large port count (e.g. 8 ports or higher) is required.

In their research paper "Wavelength Selective Crossconnects", Proceedings of the 18$^{th}$ OptoElectronics and Communications Conference 2013, Paper ThT1-4, N. K. Fontaine et al. propose a double-path N×M wavelength selective switch for hitless switching that relies on two beam steering elements with a Fourier transform region in between, where the angular shifts can become displacements on the next array. However, these techniques require a sophisticated control of the optical elements, which provides challenges in real-life applications. Fontaine emphasizes the general requirement that the dispersed wavelengths must form continuous images. If the images are not properly maintained, undesired passband effects can occur. In their research paper "6 port 3×3 Wavelength Selective Cross-Connect by Software-Only Reprogramming of a 1×N Wavelength Selective Switch"; OFC 2015, J. Schröder et al. propose a single-path N×M wavelength selective switching that relies on reuse of known WSS. However this limits the port count and the general useability of the WSS, because low and high order unwanted beams are hitting ports depending on the switch configuration.

What is needed is a more robust and practically viable wavelength selective switching device and ROADM structure that allow reliable switching and a high add/drop capacity for colorless, directionless and hitless switching.

OVERVIEW OF THE INVENTION

This objective is achieved by the present invention.

A wavelength selective switching device according to the present invention comprises a plurality of input paths for receiving optical signals, a plurality of output paths for emitting said optical signals, and a switching unit for selectively directing said optical signals from said input paths to said output paths. Said switching unit comprises a reflective area adapted to be concurrently illuminated in a slice of the optical spectrum by a first optical signal from a first input path among said plurality of input paths, and by a second optical signal from a second input path among said plurality of input paths, said second input path being different from said first input path, and to concurrently direct said first optical signal to a first output path among said plurality of output paths and said second optical signal to a second output path among said plurality of output paths, said second output path being different from said first output path. Said first output path and said second output path are spatially separated by said first input path and said second input path, or vice-versa said first input path and said second input path are spatially separated by said first output path and said second output path.

Said plurality of input paths and said plurality of output paths may be arranged along a linear array.

By providing a switching unit with a reflective area that can be operated in said slice of the optical spectrum to concurrently direct said first optical signal to said first output path and said second optical signal to said second output path, the wavelength selective switching device may allow for a robust and hitless routing while at the same time making efficient use of the available ports. This allows building practically viable ROADM structures (possibly with a high number of input ports and output ports) for wavelength division multiplexing while at the same time reducing the amount of both the optical components and the cabling. In particular, unlike the proposal by N. K. Fontaine et al., the wavelength selective switching device according to the present invention does not require a double-path.

In particular, said first optical signal and said second optical signal may have at least partial spectral overlap. This allows for an independent routing of at least two channel sets, such as two optical C-band DWDM channel sets.

Said switching unit may be adapted to allow said first optical signal from said first input path and said second optical signal from said second input path to at least partly overlap spatially on said reflective area.

In an embodiment, said reflective area is adapted to spatially separate said first optical signal from said first input path and said second optical signal from said second input path.

Due to the spatial separation, the reflected first and second optical signals may be collected in different output paths, thereby avoiding interference.

These spatial locations of input paths relative to output paths cause that the related unwanted first ghost output path and unwanted second ghost output path may be spatially separated from the plurality of output paths. Thus, the unwanted signals can be easily suppressed by space selective means such as isolators. Unwanted higher order ghost output paths appear at locations where they can be suppressed to large extent by frequency selective means such as subsequent WSS and frequency selective optical receiver, and/or said space selective means.

In an example, said plurality of input paths and said plurality of output paths may be arranged in an array, and said second output path is spatially separated from said first output path by a plurality of input paths.

In an example, said input paths correspond to input ports of said wavelength selective switching device.

Similarly, said output paths may correspond to output ports of said wavelength selective switching device.

In the present disclosure, the reference to input and output paths is a notational convention that reflects one particular use of the wavelength selective switching device. However, one skilled in the art will readily understand that the optical signal paths in the wavelength selective switching device are generally reversible, and hence what is labeled herein an input path can likewise serve as an output path, and vice versa.

Hence, in an example, said plurality of input paths and said plurality of output paths may be arranged in an array, and said second input path is spatially separated from said first input path by a plurality of output paths.

In an embodiment, said first input path and said second input path are arranged between said first output path and said second output path, or vice versa.

In an embodiment, the wavelength selective switching device comprises a first set of output paths and a second set of output paths, wherein said input paths are spatially located in between said first set of output paths and said second set of output paths, or vice-versa.

By limiting the number of output paths it is achieved that unwanted first ghost output path and unwanted second ghost output path are spatially separated from the plurality of output paths. The first or second set of output paths may each comprises any number of output paths, in particular one output path, or a number of output paths being not higher than half the number input paths.

Said input paths may correspond to input ports and said output paths may correspond to output ports.

In an example, said input ports are spatially located in between said first set of output ports and said second set of output ports. Alternatively, said output ports may be spatially located in between said first set of input ports and said second set of input ports.

In an example, neighboring input ports are preferably wider spaced than neighboring output ports. At least one output port of said first plurality of output ports may be spaced away from a first input port of a pair of neighboring input ports of said plurality of input ports by a distance that is different from an integer multiple of the distance between said pair of neighboring input ports; and at least one output port of said second plurality of output ports may be spaced away from said first input port of said pair of neighboring input ports by a distance that is equal to an integer multiple of half the distance between said pair of neighboring input ports.

In an example, neighboring input ports and neighboring output ports are equally spaced. At least one output port of said first plurality of output ports may be spaced away from a first input port of a pair of neighboring input ports of said plurality of input ports by a distance that is different from an integer multiple of the distance between said pair of neighboring input ports; and at least one output port of said second plurality of output ports may be spaced away from said first input port of said pair of neighboring input ports by a distance that is equal to an integer multiple of the distance between said pair of neighboring input ports.

In an example, said input ports are spaced apart from said first plurality of output ports by a distance that is different from the distance between neighboring ports, in particular larger than the distance between neighboring ports.

Similarly, said input ports may be spaced apart faun said second plurality of output ports by a distance that is different from a distance between neighboring ports, in particular larger than a distance between neighboring ports.

Alternatively, the role of input paths and output paths may be reversed. Hence, in an embodiment the wavelength selective switching device comprises a first set of input paths and a second set of input paths, wherein said output paths are spatially located in between said first set of input ports and said second set of input ports.

The first or second set of input paths may each comprise any number of input paths, in particular one input path or a plurality of input paths.

Said input paths may correspond to input ports and said output paths may correspond to output ports.

In an example neighboring output ports are preferably wider spaced than neighboring input ports. In an example, at least one input port of said first plurality of input ports is spaced away from a first output port of a pair of neighboring output ports of said plurality of output ports by a distance that is different from an integer multiple of the distance between said pair of neighboring output ports; and at least one input port of said second plurality of input ports may be spaced away from said first output port of said pair of neighboring output ports by a distance that is equal to or essentially equal to an integer multiple of half the distance between said pair of neighboring output ports.

In an example, neighboring input ports and neighboring output ports are equally spaced. At least one input port of said first plurality of input ports may be spaced away from a first output port of a pair of neighboring output ports of said plurality of output ports by a distance that is different from an integer multiple of the distance between said pair of neighboring output ports; and at least one input port of said second plurality of input ports may be spaced away from said first output port of said pair of neighboring output ports by a distance that is equal to or essentially equal to an integer multiple of the distance between said pair of neighboring output ports.

In an example, said reflective area comprises a plurality of director units adapted to direct said first optical signal to said first output path, and said second optical signal to said second output path.

Said plurality of director units allows to spatially separate said first optical signal from said second optical signal when said first optical signal and said second optical signal concurrently illuminate said reflective area.

In an example, said plurality of director units is adapted to direct said first optical signal to a third output path different from said first and second output paths, wherein said wavelength selective switching device is adapted to selectively deactivate said third output path.

The selective deactivation of said third output path may avoid the foil cation of disturber signals at least one output node of the first plurality of output nodes and at least one output node of the second plurality of output nodes of the wavelength selective switching device.

Similarly, said plurality of director units may be adapted to direct said second optical signal to a fourth output path different from said first and second output paths, wherein said wavelength selective switching device is adapted to selectively deactivate said fourth output path.

The selective deactivation of said forth output path may avoid the formation of disturber signals at at least one output node of the first plurality of output nodes and at least one output node of the second plurality of output nodes of the wavelength selective switching device.

In an example, said output ports are spaced apart from said first plurality of input ports by a distance that is different from the distance between neighboring ports, in particular larger than the distance between neighboring ports.

Similarly, said output ports may be spaced apart form said second plurality of input ports by a distance that is different from a distance between neighboring ports, in particular larger than a distance between neighboring ports.

In an example, said reflective area comprises a first plurality of director units adapted to direct said first optical signal to said first output path, and further comprises a second plurality of director units adapted to direct said second optical signal to said second output path.

Said first and second plurality of director units may allow to spatially separate said first optical signal from said second optical signal when said first optical signal and said second optical signal concurrently illuminate said reflective area.

In an example, said second plurality of director units is adapted to direct said first optical signal to a third output path different from said first and second output paths, wherein said wavelength selective switching device is adapted to selectively deactivate said third output path.

The selective deactivation of said third output path avoids the formation of disturber signals at output nodes of the wavelength selective switching device that might otherwise form at the output nodes or input nodes of the wavelength selective switching device.

Similarly, said first plurality of director units may be adapted to direct said second optical signal to a fourth output path different from said first and second output paths, wherein said wavelength selective switching device is adapted to selectively deactivate said fourth output path.

In an example, said first director units and said second director units may be spatially interleaved on said reflective area.

A spatially interleaved configuration may allow to better decouple the switching of the optical signals having spectral overlap.

Said switching unit and said selective area may be formed in a plurality of alternative techniques and materials.

In an example, said reflective area comprises a liquid crystal formed on a semiconductor structure, in particular a liquid crystal on silicon (LCoS).

Said liquid crystal formed on said semiconductor structure may comprise a plurality of pixels arranged in a pixel array, wherein each pixel may be individually controllable for imparting a pre-defined phase retardation profile for said respective first optical signal and second optical signal impinging on said reflective area.

Alternatively, said reflective area may comprise a micro-electro-mechanical system (MEMS) with a plurality of tiltable mirrors.

A pixel array of tiltable mirrors whose degree of tilting can be individually controlled, allows to selectively direct said incoming first and second optical signals impinging on said tiltable mirrors to selected output paths.

Said wavelength selective switching device may further comprise an attenuation unit for selectively attenuating the power of said optical signals.

Said wavelength selective switching device may further comprise a first wavelength-selective coupler unit to couple the input paths to the switching unit and a second wavelength-selective coupler unit to couple the switching unit to the output paths.

The invention further relates to a reconfigurable optical add/drop multiplexer device, comprising a wavelength selective switching device with some or all of the features described above.

A reconfigurable optical add/drop multiplexer device according to the present invention allows for hitless optical switching between express directions and between express and add/drop multiplexer, while at the same time makes more efficient use of the WSS ports. Cabling between the WSS modules is significantly reduced.

In an example, said first input path and said second input path are in the add path of a DWDM scheme.

Alternatively, said first output path and said second output path may be in the drop path of a ROADM of a DWDM scheme.

In this configuration, the reconfigurable optical add/drop multiplexer allows to add or drop paths from two C-band DWDM channel sets in a single WSS switch, thereby significantly reducing the complexity, size, and cost of the ROADM structure.

In an example, the reconfigurable optical add/drop multiplexer device comprises a plurality of wavelength selective switching devices with some or all of the features described above, wherein a first wavelength selective switching device among said plurality of wavelength selective switching devices comprises a first input path being part of an add path corresponding to an add port and a second input path being optically coupled to a transmission path and a first output path being optically coupled to an input path of a second wavelength selective switching device among said plurality of wavelength selective switching devices.

In particular, said second wavelength selective switching device may comprise an output path being part of the drop path of an ROADM.

In this configuration, the add and/or drop functionality may be included in some or all of the express layer wavelength selective switches. Hence, a full add/drop capability can be provided without separate and dedicated WSS switches, resulting in a particularly lean and compact ROADM structure.

In an example, the reconfigurable optical add/drop multiplexer device comprises a plurality of wavelength selective switching devices with some or all of the features described above, wherein a first wavelength selective switching device among said plurality of wavelength selective switching devices comprises a first input path optically coupled to a first transmission path and a second input path optically coupled to a second transmission path and a first output path optically coupled to an input path of a second wavelength selective switching device among said plurality of wavelength selective switching devices.

In this configuration, a wavelength selective switch may combine two DWDM signals coming in from two transmission fibers. This structure again leads to a compact configuration, and may be of particular interest if several fibers connecting two stations are provided in a common cable.

This ROADM structure may combine advantageously with spatial division multiplex (SDM) fibers such as weakly multimode fibers or multicore fibers, which connect to the ROADM via spatial mode splitters and combiners. A ROADM with WSS units according to the invention can do efficiently parallel processing of DWDM channel sets in SDM transmission. Such a ROADM can switch the order of the mode of the optical fiber used by the travelling DWDM channel set.

In an embodiment, two output ports of the ROADM at a WSS for two outgoing DWDM channel sets are connected to two spatial mode combiners and the related two SDM fibers.

In another embodiment, the two ROADM output ports at a WSS according to the invention are connected to one spatial mode combiner and the related SDM fiber. In this case residual crosstalk introduced by the WSS can be mitigated together with other modal crosstalk occurring along the SDM optical transmission path by digital signal processing in the down-stream transponder at the end of the optical path of an optical signal channel.

A transmission path, in the sense of the present disclosure, may denote an input path of a ROADM structure, or an output path of an ROADM structure.

In an example, the reconfigurable optical add/drop multiplexer comprises a plurality of wavelength selective switching devices with some or all of the features described above, wherein a first wavelength selective switching device among said plurality of wavelength selective switching devices comprises a first output path optically coupled to a first transmission path and a second output path optically coupled to a second transmission path and a first input path optically coupled to an output path of a second wavelength selective switching device among said plurality of wavelength selective switching devices.

The invention also relates to a corresponding method for wavelength selective switching, comprising the steps of receiving a first optical signal at a first input path and a second optical signal at a second input path different from said first input path, illuminating a reflective area concurrently both with said first optical signal and said second optical signal, and controlling said reflective area to concurrently direct said first optical signal from said reflective area to a first output path and said second optical signal from said reflective area to a second output path different from said first output path. Said first output path and said second output path may be spatially separated by said first input path and said second input path, or vice-versa.

Said plurality of input paths and said plurality of output paths may be arranged in an array, and said second output path is spatially separated from said first output path by a plurality of input paths, or vice versa.

In the context of the present disclosure, said first optical signal and said second optical signal may be light signals in the visible spectrum. However, the invention applies to optical signals across the entire wavelength range including wavelength ranges both longer and shorter than the visible wavelength range.

In the context of the present disclosure, said first optical signal and said second optical signal may be light signals in the spectral range where the transmission fiber has favorable properties such as low optical attenuation or low chromatic dispersion or where optical amplification is available. As such the wavelength range 1250 nm to 1650 nm and more specifically 1520 nm to 1630 nm is of particular interest.

In an example, said first optical signal and said second optical signal have at least partial spectral overlap.

In an embodiment, said first input path and said second input path are spatially located between said first output path and said second output path, or vice-versa.

The method may further comprise the step of spatially separating said first optical signal from said first input path and said second optical signal from said second input path.

In particular, the method may be performed employing a wavelength selective switching device or a reconfigurable optical add/drop multiplexer device with some or all of the features described above.

In an example, said first optical signal is added via said first input path and/or said second optical signal is added via said second input path.

The method may further comprise a step of dropping said first optical signal via said first output path and/or dropping said second optical signal via said second output path.

In an example, said first optical signal is added via said first input path and said second optical signal is received via said second input path from a first optical transmission path.

In particular, said method may further comprise a step of transmitting said first optical signal and/or said second optical signal in a second optical transmission path.

In another example, said first optical signal may be received at said first input path from a first optical transmission path and said second optical signal may be received at said second input path from a second optical transmission path.

In particular, said method may further comprise a step of transmitting said first optical signal and/or said second optical signal in a third optical transmission path.

The disclosure further relates to a computer program or to a computer program product, said computer program and said computer program product, respectively, comprising computer-readable instructions, wherein said instructions, when read on a computer, in particular a computer coupled to a wavelength selective switching device or a reconfigurable optical add/drop multiplexer device with some or all of the features described above, implement on said device a method with some or all of the features described above.

BRIEF DESCRIPTION OF THE DRAWINGS

The features and numerous advantages of the wavelength selective switching device and the reconfigurable optical add/drop multiplexer device according to the invention will best be understood from a detailed description of embodiments with reference to the enclosed drawings, in which:

FIG. 4 is a conceptional schematic drawing that shows the functionality and optical path in a wavelength selective switching device according to an embodiment;

DETAILED DESCRIPTION

Figure 1A:
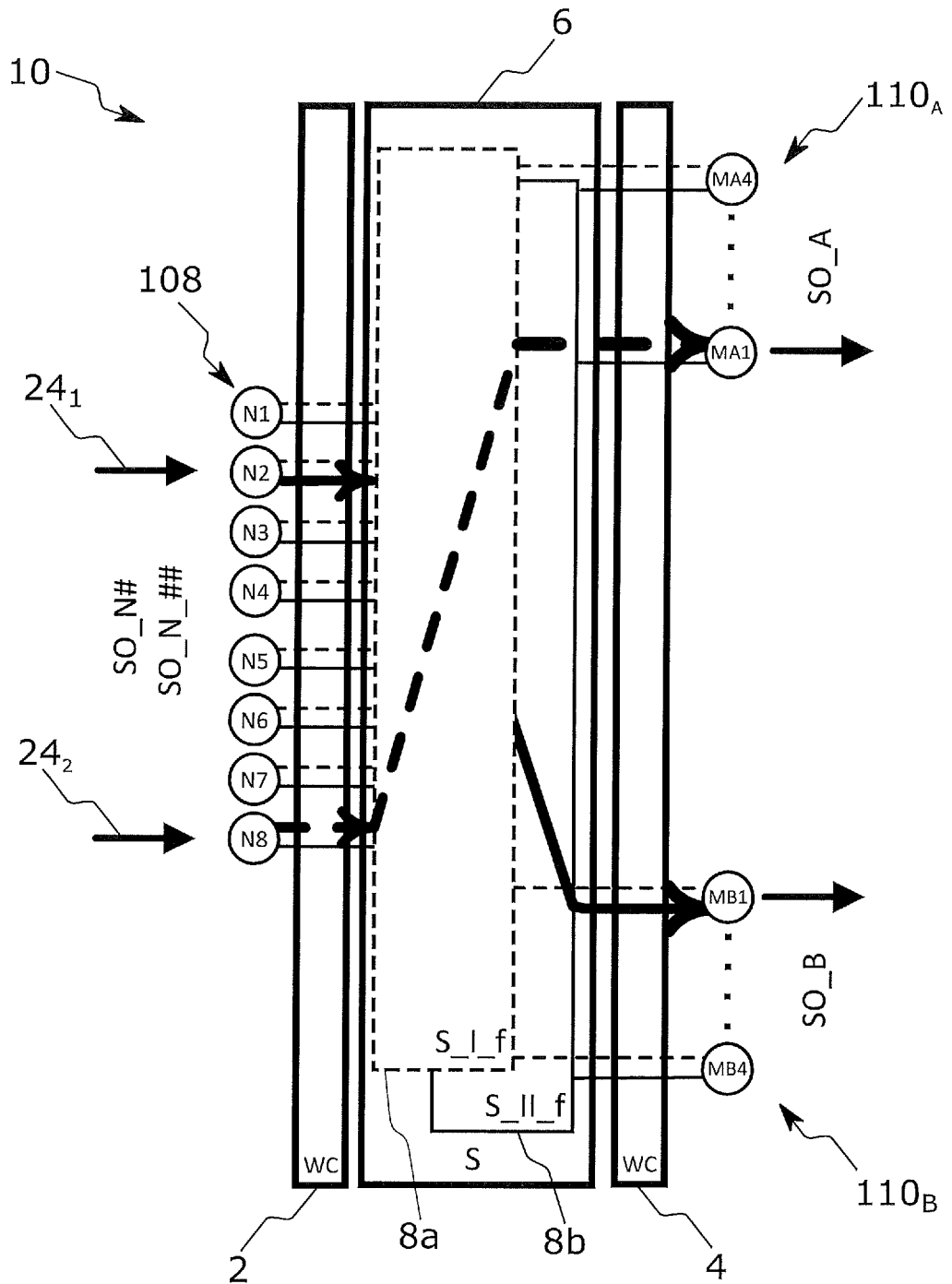
FIG. 1a is a functional diagram that illustrates the optical path switching in a N×($M_A$ & $M_B$) wavelength selective switching device according to an embodiment.

FIG. 1a is a schematic illustration of a wavelength selective switch (WSS) 10 according to an embodiment. The WSS 10 is an optical N×($M_A$ & $M_B$) switch that can independently switch individual wavelength channels from a first set of N input ports to a second and a third set of $M_A$ and $M_B$ output ports, wherein N≥2, $M_A$≥1 and $M_B$≥1. In the configuration of FIG. 1a, eight input ports 108 $N_1$ to $N_8$ are shown and switched to a second set of four output ports $110_A$ $M_{A1}$ to $M_{A4}$ and a third set of four output ports $110_B$ $M_{B1}$ to $M_{B4}$. However, these numbers are mere examples, and a wavelength selective switch according to an embodiment may comprise a smaller or larger number of input ports, and a smaller or larger number of output ports, as desired.

As can be taken from FIG. 1a, the second set $110_A$ of $M_A$ output ports and the third set $110_B$ of $M_B$ output ports each is capable to receive, distributed over its of output ports, a DWDM signal $SO_A$ and $SO_B$, respectively. Each of these two DWDM signals $SO_A$ and $SO_B$ contains spectral signal slices selected and collected in configurable manner from the N DWDM signals $SO_{N1}$ . . . $SO_{N8}$ incoming at the first plurality 108 of N input ports. This means that the DWDM signal $SO_A$ contains spectral signal slices coming out of ports $M_{A1}$, $M_{A2}$, $M_{A3}$, and/or $M_{A4}$, depending on input signal sets and WSS configuration. This means that DWDM $SO_B$ contains, spectral signal slices coming out of ports $M_{B1}$, $M_{B2}$, $M_{B3}$, and/or $M_{B4}$, depending on input signal sets and WSS configuration.

As can be further taken from FIG. 1a, the wavelength selective switch 10 comprises a first wavelength selective coupler 2 at the input side receiving the signals from the N input ports, a second wavelength selective coupler 4 at the output side coupled to the $M_A$ output ports and the $M_B$ output ports, as well as a switching plane unit 6 in the optical path between the first and second wavelength selective couplers 2, 4. The first wavelength selective coupler 2 in the input path of the WSS 10 decomposes the incoming DWDM signals into spectral slices. A first optical signal incident on a first input path $24_1$ is depicted in FIG. 1a by a solid line, and a second input signal on a second input path $24_2$ is indicated in FIG. 1a by a dashed line. Both optical signals are spectrally dispersed incident on the switching plane unit 6, which may comprise a Liquid Crystal on Silicon (LCoS) pixel arrangement, as will be described in more detail below. The LCoS switching plane unit 6 imposes optical spectrum slice dependent phase retardations on the incoming signals. Each incoming optical signal spectral slice is exposed to a phase ramp, which is set up to direct light of the first and of the second incoming wave to the respective output port of output port sets $M_A$ and $M_B$, as will be described in more detail below.

For instance, the switching plane unit 6 may comprise two switching plane subunits 8a, 8b, wherein the first subunit 8a is configured to deflect and direct input signal slices to one or more of the output ports of the output port set $110_A$ (in this example to port $M_{A1}$), and the second subunit 8b is configured to deflect and direct input signal slices to one or more of the output ports of the output port set $110_B$ (in this example to port $M_{B1}$). For a given output port of the output port set $110_A$, the related switching subunit 8a preferably extends over a continuous area on the switching area 6. Similarly, for a given output port of the output port set $110_B$, the related switching subunit 8b preferably extends over a continuous area on the switching area 6. Thereby, at a given output fiber, the spectral signal slices collected from different input fibres form a continuous image on the switching plane, such as to avoid anomalies such as spectral ripple and crosstalk.

While the switching plane subunits 8a, 8b are illustrated as separate and distinct subunits in the conceptional diagram of FIG. 1a, in some physical implementations they may be realized as one common switching plane making use of the same pixel groups. For instance, the $M_A$ output port set $110_A$ can be served by a first part of the switching plane unit 6, whereas the $M_B$ output port set $110_B$ can be served by a second part of the switching plane unit 6, wherein the first and second parts can coincide on the switching plane, or can be spatially disjunct or spatially interleaved. The second wavelength selective coupler 4 in the output path of the WSS 10 superimposes the spectral slices directed towards the respective output ports.

At a given slice of the optical spectrum, the related LCoS phase retardation profile (phase grating) serves two output ports, one in the output port set $M_A$ ($110_A$), the other in the output port set $M_B$ ($110_B$). Because light from both inputs experience the same LCoS phase retardation profile, only a fraction (typically about half) of the light from the single input port will be directed to the desired output port, after passing through the wavelength selective coupler 4 in the output paths of the WSS 10. The remaining fraction appears in other phase grating diffraction order beams and is not part of the functional description in FIG. 1a. As will be explained in further detail below, the remaining fraction is directed away from the outputs by means of the invention, so as to avoid unwanted interference.

At a given optical spectrum slice f, not selected incoming signals (if present at all) in incoming waves of other ports of the input port set are directed away from the output ports selected for the spectral slices in the output DWDM signals $SO_A$ and $SO_B$. If they appear at output ports, other than those chosen for the selected signal spectral slices in the output DWDM signals $SO_A$ and $SO_B$.

The WSS arrangement according to the invention has the feature that the power split between the beams directed toward output port set $M_A$ ($110_A$) and output port set $M_B$ ($110_B$) is configurable by the spatial distribution of the phase grating. E.g. configuring the pixel rows such that a phase grating is built up which has different diffraction orders overlayed in a manner that one beam is enhanced at the expense of the other. This method is generally known, e.g. from text books describing grating geometry via Fourier decomposition. Or configuring the pixel rows such that the phase gratings serving the two ports are spatially separated or spatially interleaved, and by enlarging grating section serving output port set $M_A$ ($110_A$) at the expense of the size of the other serving $M_B$ ($110_B$), or vice versa. This WSS feature may advantageously be used for example in a ROADM which employs a WSS according to the invention to simultaneously output with low loss a first DWDM channel set to a transmission fiber, and to send with somewhat higher loss a further DWDM channel set to drop ports. Channels of the first DWDM channel set and the further DWDM channel set can have partial or full spectral overlap. Such ROADM arrangement is described further below.

Figure 1B:
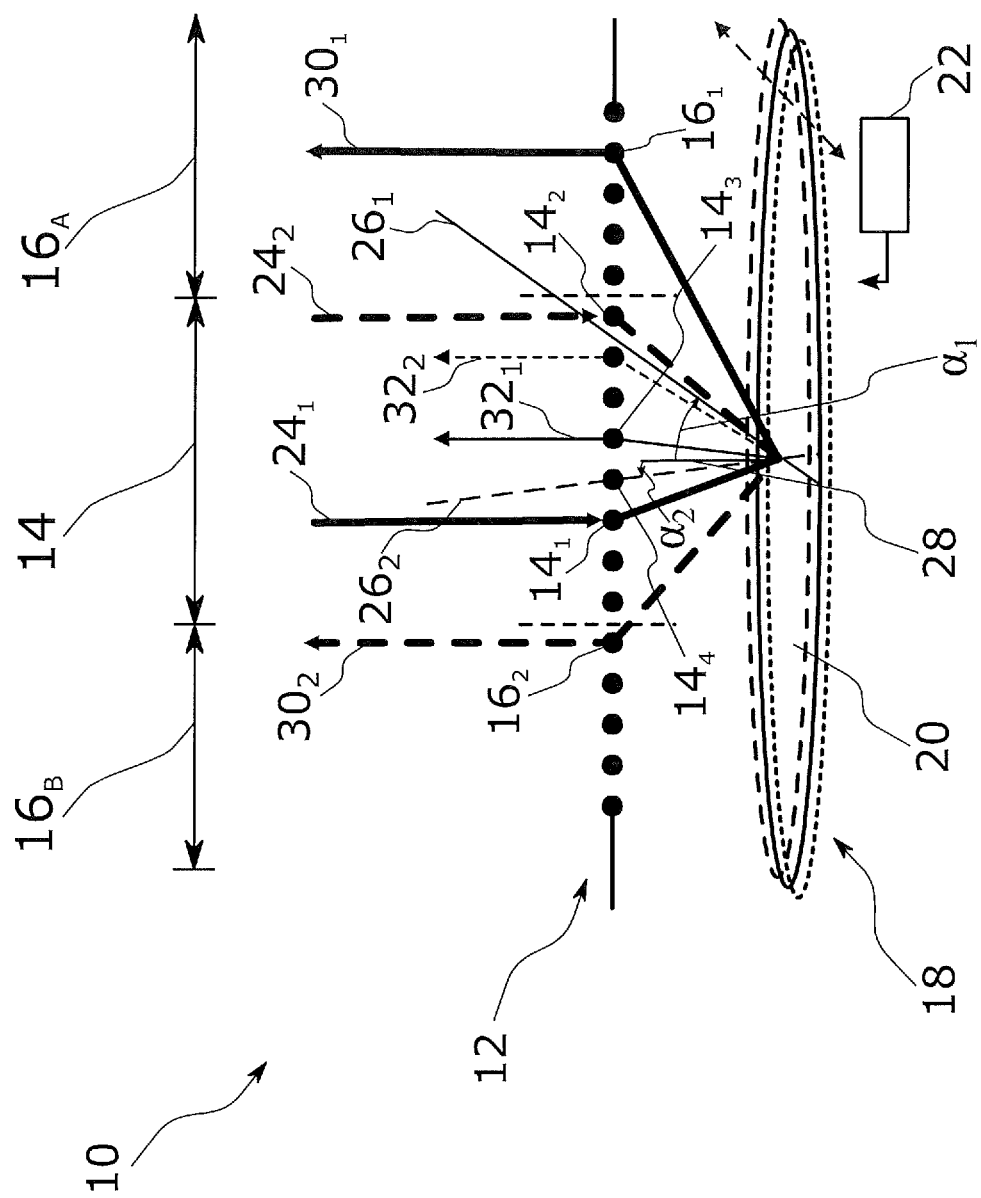
FIG. 1b is a conceptional schematic drawing of the optical path in a wavelength selective switching device according to an embodiment.

FIG. 1b is a conceptional illustration of the light paths in the wavelength selective switch 10. In the configuration of FIG. 1b, the input ports and the output ports are arranged in a linear array 12, wherein a central portion 14 of the array 12 corresponds to the input ports, a first lateral portion $16_A$ corresponds to the first set of $M_A$ output ports, and a second lateral portion $16_B$ of the array 12 corresponds to the set of $M_B$ output ports.

The wavelength selective switch 10 further comprises a switching unit 18 with a reflective area 20 for selectively directing optical signals incident from the input ports 14 to the output ports $16_A$, $16_B$.

For instance, the switching unit 18 may comprise a plurality of liquid crystal on silicon (LCoS) pixels that can be individually addressed by means of a control unit 22 to selectively impart a phase retardation profile to a wavelength path impinging on the reflective area 20, which is illuminated on the switching plane unit 18 (not shown for simplicity). This will be described in more detail below and with reference to FIGS. 2 and 3 and 5c.

Alternatively, the reflective area 20 may comprise a plurality of tiltable micro-electro-mechanical system (MEMS) mirrors that can individually be adjusted by means of the control unit 22.

The wavelength selective switch 10 is adapted to selectively receive optical signals from a plurality of input paths corresponding to the input ports 14, and to selectively reflect them by means of the reflective area 20 and to direct them to selected output paths corresponding to the output ports $16_A$, $16_B$. In the illustration of FIG. 1b, two input paths $24_1$ and $24_2$ corresponding to input ports $14_1$ and $14_2$, respectively, are represented as input light paths. For instance, a first optical signal incident on the first input path $24_1$ and a second optical signal incident on the second input path $24_2$ may be input signals stemming from different directions of a ROADM express layer. The input paths $24_1$ and $24_2$ direct the first and second input signals concurrently on the reflective area 20 via a wavelength selective coupler optics 2, 4.

The action of the wavelength selective coupler optics is illustrated by the dashed line and dotted line areas being shifted on the switching plane unit 18 with respect to the area 20. The wavelength selective coupler optics 2, 4 is not shown for simplicity.

The reflective area 20 is configured to establish different deflections for each of the two incident waves. This is illustrated by the two bisecting lines $26_1$ and $26_2$, that are tilted differently with respect to a geometrical normal direction 28 (perpendicular to the surface of the reflective area 20) by respective tilt angles $\alpha_1$ and $\alpha_2$. Upon proper choice of the tilt angles $\alpha_1$, $\alpha_2$, the reflective area 20 directs the first optical signal from the first input path $24_1$ to a first output path $30_1$ corresponding to a first output port $16_1$ among the first set of output ports $16_A$, and concurrently directs the second optical signal incident on the second input path $24_2$ to a second output path $30_2$ corresponding to a second output port $16_2$ among the second set of output ports $16_B$. In effect, the wavelength selective switch 10 hence spatially separates the input signals concurrently incident on the input paths $21_1$, $21_2$ into different directions, thereby permitting independent routing of two path sets that can have partial or full spectral overlap. The switching of one of the paths conceptually and essentially also physically does not affect the routing of the other path, thereby establishing a hitless switching. This hitless switching refers also to efficient suppression of disturber signals, as set forth below.

As further illustrated in FIG. 1b, deflection at the reflective area 20 may further lead to first and second disturber signals $32_1$, $32_2$, wherein the first disturber signal $32_1$ stems from a deflection of the signal incident on the first input path $24_1$ according to the second bisecting line $26_2$, and the second disturber signal $32_2$ stems from a deflection of the input signal incident on the second input path $24_2$ according to the first bisecting line $26_1$. In case the disturber signals $32_1$ and/or $32_2$ correspond geometrically to input or output ports, such input ports $14_3$ and $14_4$ as illustrated in FIG. 1b, they may lead to unwanted signals in these ports. However, given that these signals $32_1$, $32_2$ do not appear among the sets of output ports $16_A$, $16_B$, but merely appear among the set of input ports 14 as a contra-directional signal, they can be ignored or easily deselected. Isolators may be employed to filter these contra-directional signals.

Figure 1C:
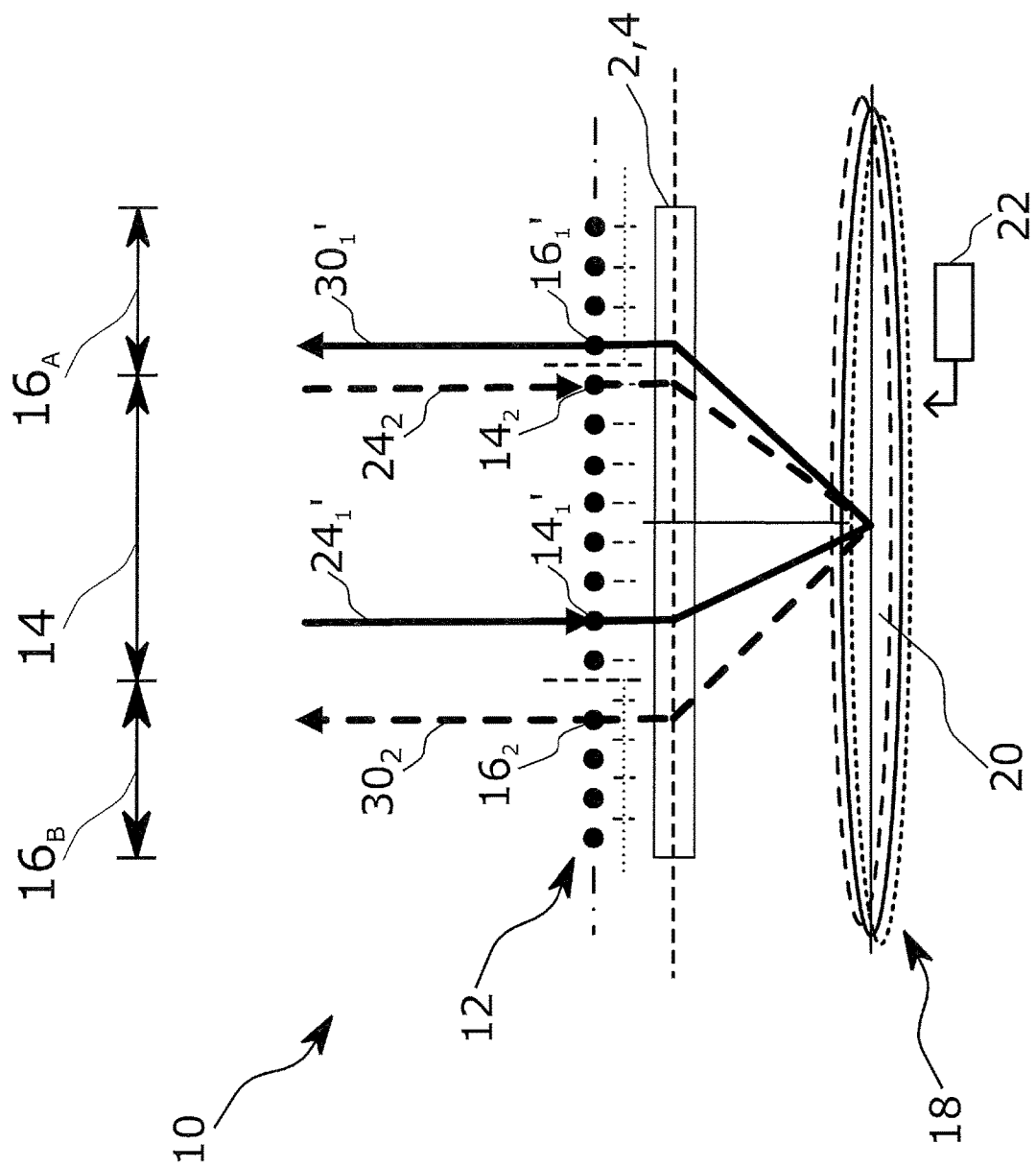
FIG. 1c is another conceptional schematic drawing of the optical path in a wavelength selective switching device according to an embodiment with the disturber signals removed.

FIG. 1c shows another example of an optical path diagram of a wavelength selective switch 10 according to an embodiment, and corresponding parts are shown with the same reference numerals in FIGS. 1b and 1c. However, contrary to the configuration of FIG. 1b, one of the two sets of output ports has an offset with respect to the pitch of the set of input ports. In more detail, in the array 12 of input ports and output ports according to FIG. 1c, for a pair of ports consisting of an output port of the set of output ports $16_B$ and an input port from the set of input ports 14, the distance corresponds to approximately $(0.5+K_B)$ times the pitch between neighboring input ports 14, where $K_B$ is a non-negative integer number ($K_B$=0, 1, ...). In FIG. 1c, the distance between the output port $16_2$ and the related input port is $14_2$ is 8.5 times the pitch between neighboring input ports ($K_B$=8). Likewise, the distance could be e.g. 9.5 times the pitch between neighboring input ports if another output port is used.

For clearness, in FIG. 1c, such distance between an output port of the other (first) set of output ports $16_A$ and an input port from the set of input ports 14 by corresponds to approximately $K_A$ times the pitch between neighboring input ports 14, where the $K_A$ is positive integer number ($K_A$=1, 2, ...). In FIG. 1c, the distance between the output port $16'_1$ and the related input port is $14'_1$ is 7.0 times the pitch between neighboring input ports ($K_A$=7). Likewise, the distance could be e.g. 8.0 times the pitch between neighboring input ports, if another input port or another output port is used.

For instance, in a preferred configuration in which the array 12 comprises a plurality of grooves and the optical fibres essentially use only every second groove, the increased distance at the boundary between the set of input ports 14 and the second set of output ports $16_B$ can be achieved by skipping two grooves instead of one groove.

For instance, in another configuration in which the array 12 comprises a plurality of grooves and the optical fibres essentially use only every second groove, an increased distance at the boundary between the set of input ports 14 and the second set of output ports $16_{13}$ can be achieved by skipping two grooves instead of one groove; and another increased distance at the boundary between the set of input ports 14 and the first set of output ports $16_A$ can be achieved by skipping four grooves instead of one groove.

For instance, in a configuration in which the array 12 comprises a plurality of grooves and the optical fibres essentially use only every third groove, the change in distance at the boundary between the set of input ports 14 and the second set of output ports $16_B$ can be achieved by skipping three grooves instead of two grooves.

In the configuration of FIG. 1c, the first input path $24'_1$ generally corresponds to the input path $24_1$ described above with reference to FIG. 1b, but it pertains to a different input port $14'_1$ closer to the boundary of the set of input ports 14. The second input path $24_2$ is identical to the second input path described above with reference to FIG. 1b. The first output port $16'_1$ and the first output path $30'_1$ differ from those shown in FIG. 1b, whereas the second output port $16_2$ and second output path $30_2$ are identical. However, the disturber signals $32_1$, $32_2$ are again only in the range of input ports 14 and therefore not shown in the diagram. Techniques for the suppression of disturber signals and crosstalk will be described in further detail below.

Figure 2:
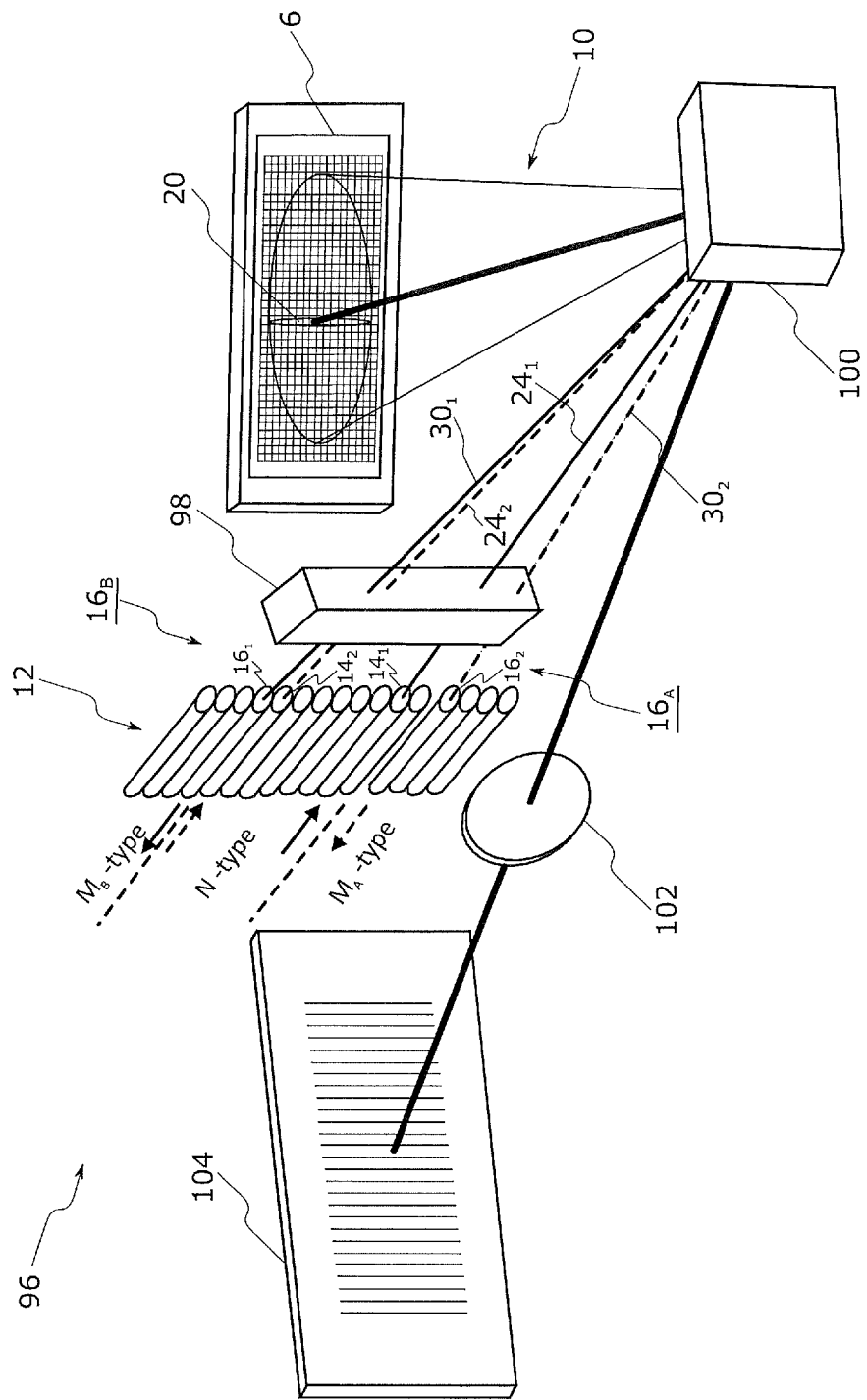
FIG. 2 is a schematic overview of an N×($M_A$ & $M_B$) wavelength selective switch arrangement according to an embodiment.

FIG. 2 is a conceptional drawing of a $N\times(M_A \& M_B)$ WSS switching arrangement 96 in which the wavelength selective switching device 10 according to the present invention can be employed. The WSS switching arrangement 96 comprises an array 12 of input ports and output ports, wherein the set of input ports 14 is sandwiched between the first and second set of output ports $16_A$, $16_B$, respectively. The WSS switching arrangement 96 further comprises a polarization diversity optics module 98, an imaging mirror 100, a switching plane unit 6, an imaging optics unit 102 and a diffraction grating unit 104.

The WSS switching arrangement 96 illustrated in FIG. 2 uses a 4-f imaging system in the dispersive (horizontal) axis. The switching plane unit 6 serves as a reflective spatial phase modulator that is capable of modifying the wavefront of the reflective light orthogonal to the dispersive axis. Light from the input ports $14_1$, $14_2$ passes through the polarization diversity optics module 98, which may comprise a highly birefringent crystal. The polarization diversity optics module 98 may spatially separate and align the orthogonal polarization states to the highly efficient polarization direction of the diffraction grating unit 104. The input light is reflected by the imaging mirror 100 and through the imaging optics unit 102 onto the diffraction grating unit 104, which angularly disperses the light, via the imaging optics unit 102 and the imaging mirror 100, onto the LCoS switching plane unit 6, such that the different wavelength components are spread out over its horizontal axis, and each wavelength component is spread out over its vertical axis.

After deflection by the LCoS switching plane unit 6, the path of the light is going back to the imaging mirror 100. The angular dispersion of the spectral components is reverted by a second passing through the imaging optics unit 102 and diffraction grating unit 104, before the light is coupled via the imaging mirror 100 and the polarization diversity optics module 98 to the respective output ports $16_1$ and $16_2$ of the first and second sets of output ports $16_A$, $16_B$, respectively. Output ports of one of the two sets of output ports have an extra shift corresponding to about 0.5 times the distance of two neighboring input ports. There are eight N-type input ports 14, four $M_A$-type output ports $16_A$, and four $M_B$-type output ports $16_B$. With this, the number of $M_A$-type output ports and $M_B$-type output ports each is not more than one half the number of N-type input ports.

Figure 3:
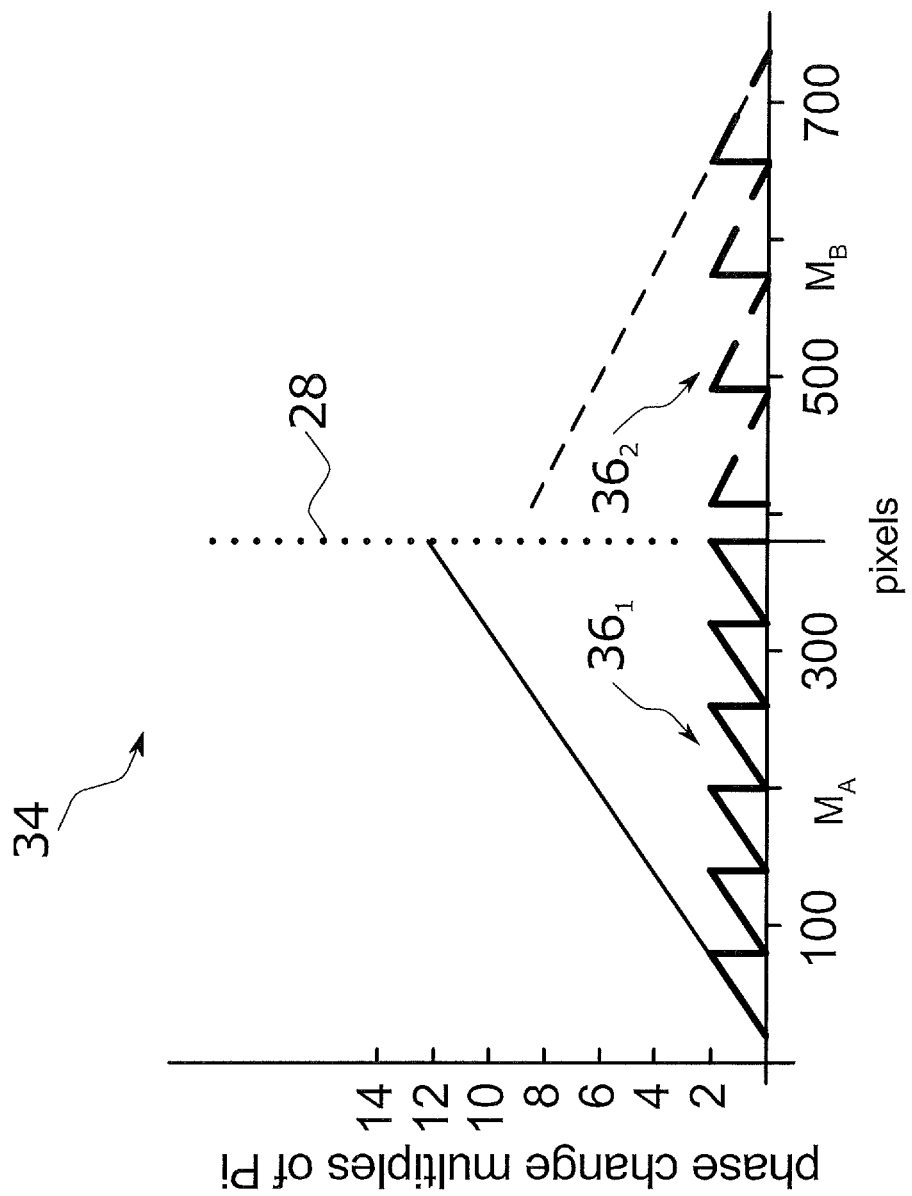
FIG. 3 is a schematic diagram to illustrate the functionality of a switching unit that can be employed in a wavelength selective switching device according to an embodiment.

FIG. 3 is a schematic illustration of a liquid crystal on silicon (LCoS) phase grating 34 which may be employed in the switching plane unit 6. The LCoS phase grating 34 comprises a plurality of pixel cells, which are shown in FIG. 3 as a one-dimensional array. However, two-dimensional arrays may also be employed. As can be taken from FIG. 3, the pixel cells are distributed into adjacent sets, a first set of LCoS pixel cells $36_1$ corresponding to the first output path $30_1$ or $30'_1$ and a second set of LCoS pixel cells $36_2$ corresponding to the second output path $30_2$. The diagram of FIG. 3 shows the respective phase change (in multiples of $\pi$) imparted by the first and second sets $36_1$, $36_2$ of LCoS pixel cells when the first and second optical signals from the respective first and second input paths $24_1$, $24_2$ concurrently impinge on the phase grating. Only pixel cells for a the small wavelength range are shown, which is shared by the two optical paths under consideration.

FIG. 3 illustrates a configuration in which the switching plane unit 6 comprises an LCoS phase grating 34. If voltages setting up the pixels generating the phase ramp $36_1$ for the input port set N to output port set $M_A$ coupling, coupling between N-type to $M_B$-type port remains stable. However, the same effect can be achieved by means of an array of micro-electro-mechanical mirrors, wherein the pixel cells are formed by tiltable mirrors whose inclination can be individually controlled by means of the control unit 22 to change the deflection angle between $M_A$ and N. The voltages setting the pixels generating the phase ramp $36_1$ have to be adapted in the first place. Coupling between $M_B$ to N port remains stable. The general requirement that the dispersed wavelengths should form continuous images should carefully be observed, to avoid undesired passband effects.

FIG. 4 schematically shows a configuration of an optical path within a wavelength selective switch 10' according to another embodiment. The wavelength selective switch 10' generally corresponds in design and functionality to the wavelength selective switch 10 described above with reference to FIGS. 1a, 1b and 1c, and hence the same reference numerals are employed to denote corresponding elements. Again, the ports 12' are arranged in an array and grouped such that the input ports 14 are positioned in between a first set of output ports 16$_A$ and a second set of output ports 16$_B$. The wavelength selective couplers 2, 4 are not shown, for ease of presentation.

However, contrary to the configuration of FIG. 1c, in the array 12' of input ports and output ports according to FIG. 4, both sets of output ports have an offset with respect to the pitch of the set of input ports. Output ports of the first set of output ports 16$_A$ are offset from the input ports 14 by a distance that corresponds to approximately $(0.5+K_A)$ times the pitch between neighboring input ports 14. Similarly, output ports of the second set of output ports 16$_B$ are spaced apart from the input ports 14 along the array, in particular by a distance that again corresponds to $(0.5+K_B)$ times the pitch between neighboring ports. $K_A$ and $\alpha_B$ are non-negative integer numbers. For instance, in a configuration in which the array 12, 12' comprises a plurality of grooves and the optical fibres essentially use only every second groove, the increased distance at the boundary between the set of input ports 14 and the first and second set of output ports 16$_A$ and 16$_B$, respectively, can be achieved by skipping two grooves instead of one groove. Other distance offsets may likewise be employed, such as 2/3 instead of 1.5.

In this configuration, the reflective area 20 still directs the first optical signal incoming on the first input path 24$_1$ via the first input port 14$_1$ to the first output path 30$_1$ on the first output port 16$_1$ and concurrently directs the second optical signal incident on the second input path 24$_2$ via the second input port 14$_2$ to the second output path 30$_2$ on the second output port 16$_2$.

When comparing the arrangements according to the FIGS. 1b, 1c and 4 with respect to the effectiveness of disturber signal suppression, all enable N×(M$_A$ & M$_B$) WSS operation with $M_A=M_B=1$.

The two low (grating) order disturbing outgoing signals (secondary signal beams 32$_1$ and 32$_2$) appear either between ports, or at input ports in counter directional direction. Same for the two output signals, if other potential input port also has incoming signal at the wavelength slice under consideration.

Each input signal can generate also higher (grating) order disturbers. The arrangement according to FIG. 1c with pitch offset on one side is advantageous, because it provides good suppression also to higher order disturbing beams. That is why FIGS. 2 and 7b show an offset to the pitch only on one side. The suppression of higher order disturbing beams is illustrated further in conjunction with FIG. 7b.

Cases with numbers M$_A$ and/or M$_B$>1, but not larger than one half of the number N are also encompassed in the invention. In these cases, the two low order disturbing outgoing signals (secondary signal beams 32$_1$ and 32$_2$) can also appear at out ports other then the configured ones.

Figure 5A:
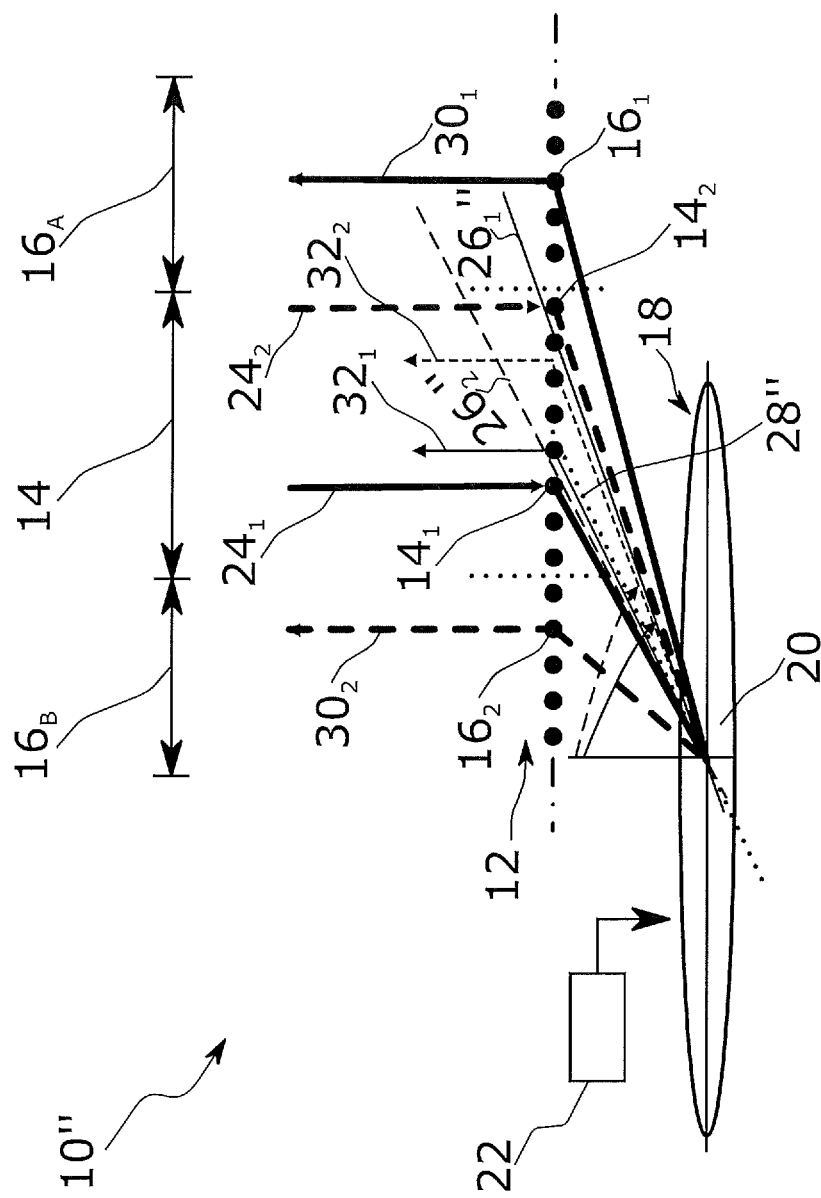
FIG. 5a is conceptional schematic drawing of the functionality and optical path in a wavelength selective switching device with a tilted base angle of the optical system according to an embodiment.

FIG. 5a is a schematic illustration of a wavelength selective switch 10" that corresponds to a large extend to the wavelength selective switch 10 described above with reference to FIGS. 1b, 1c and 4. Hence, the same reference numerals are employed to denote corresponding parts.

However, different from the wavelength selective switches 10 and 10', the reflective area 20 of the wavelength selective switch 10" is adapted to establish a tilted geometrical normal direction 28". Hence, in contrast to the geometrical normal direction 28, the geometrical normal direction 28" of the wavelength selective switch 10" is no longer (essentially) perpendicular to a surface of the reflective area 20, but is tilted, leading to corresponding tilts in the first and second optical bisecting lines 26$_1$" and 26$_2$", respectively. Tilting is a known means to suppress reflection of input signal back to the input port. The wavelength selective coupler optics is not shown, for simplicity.

Figure 5B:
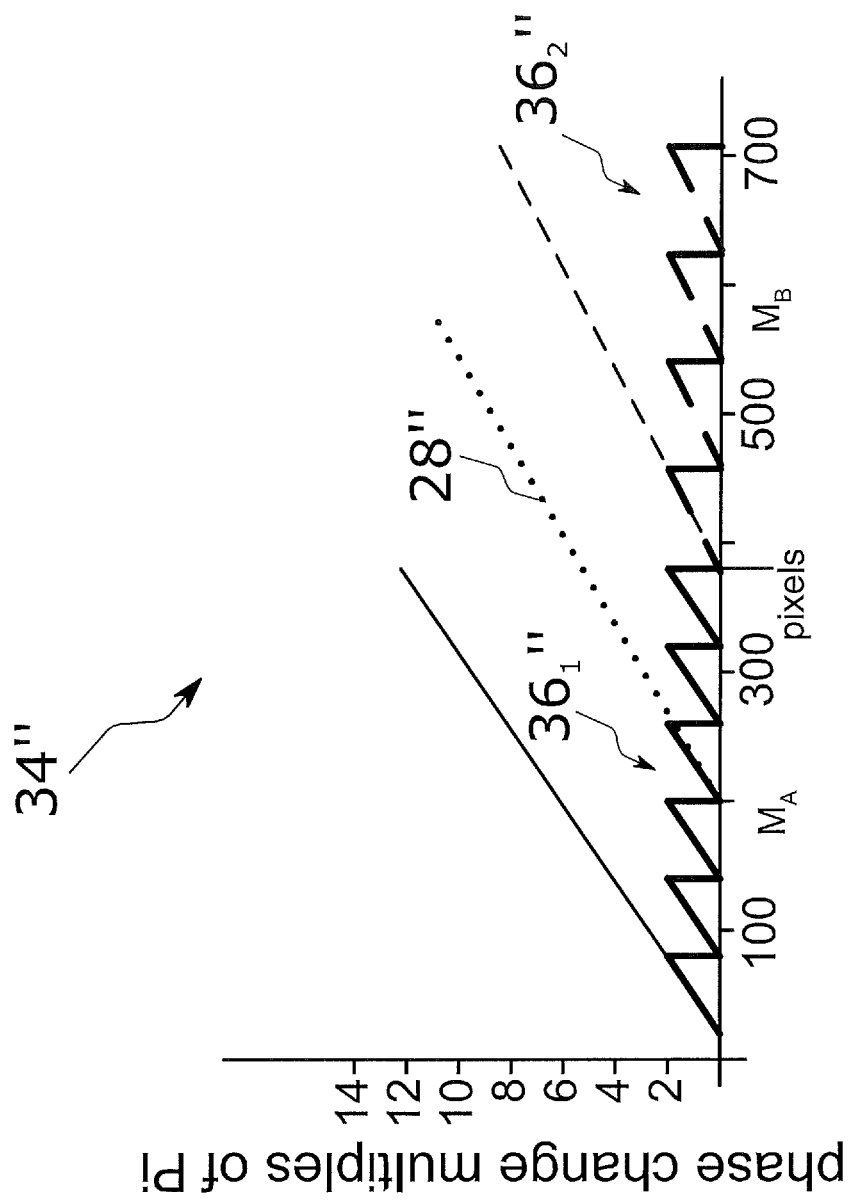
FIG. 5b is a phase change diagram that illustrates the functionality of a switching unit in a wavelength selective switching device with a tilted base angle according to an embodiment.

FIG. 5b shows a corresponding LCoS phase grating 34" with first and second sets of LCoS pixel cells 36$_1$" and 36$_2$", with an additional tilt in correspondence with the tilted geometrical normal direction 28".

In the LCoS phase gratings 34, 34" described above with reference to FIGS. 3 and 5b, the sets of pixel cells corresponding to the first set of output ports 16$_A$ and second set of output ports 16$_B$ are arranged into adjacent blocks in a linear array. However, the invention is not so limited, and in other embodiments may comprise interleaved pixel cell configurations.

Figure 5C:
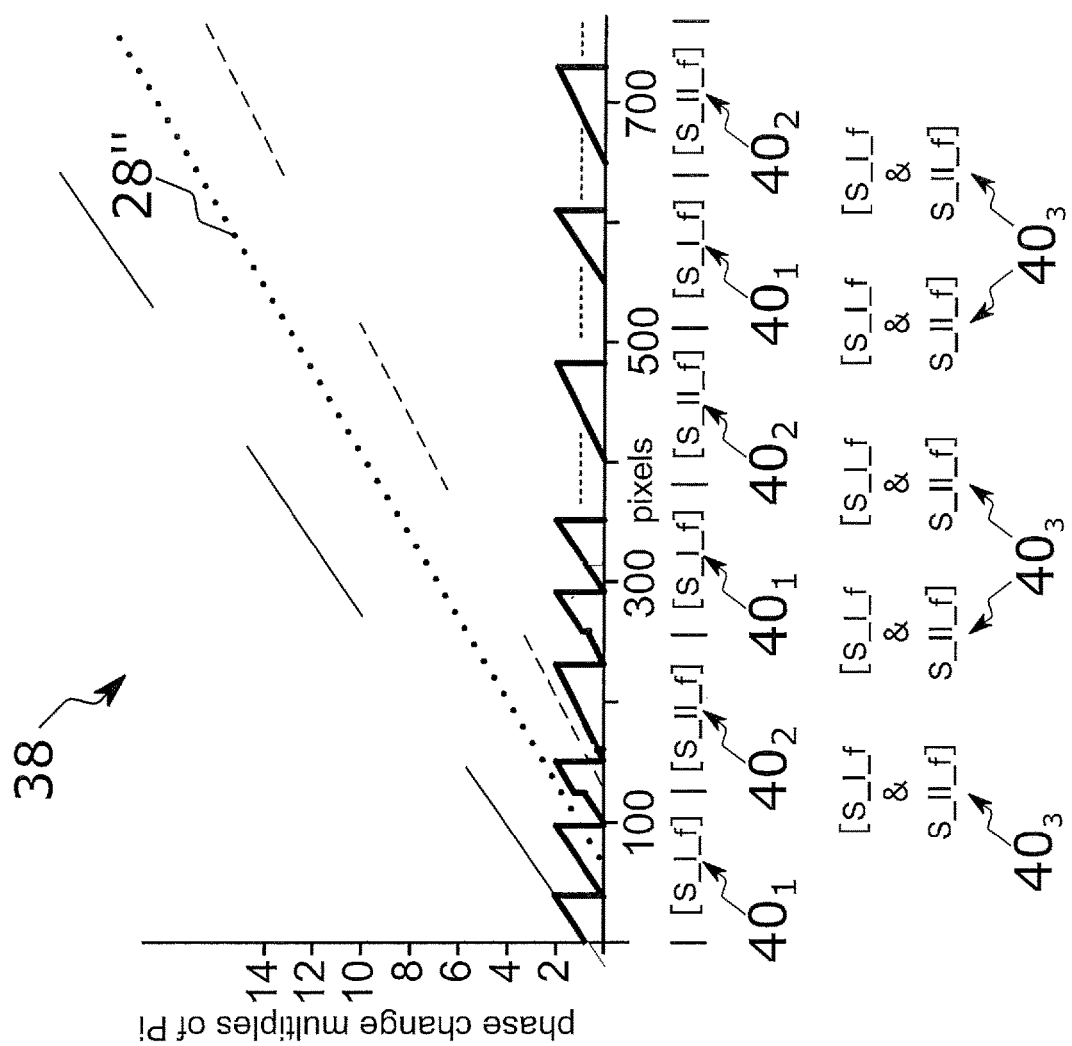
FIG. 5c illustrates the functionality of a switching unit with interleaved directors in a wavelength selective switching device according to an embodiment.

FIG. 5c shows a schematic illustration of an interleaved LCoS phase grating 38 responsible for the deflection of beams in an optical spectrum slice f. The phase grating is built up by a plurality of interleaved sets 40$_1$, 40$_2$ of pixel cells. The pixel cells in the first sets 40$_1$ can be configured to deflect a first input beam to an output port of the first set of output ports 16$_A$, and the pixel cells in the second sets of pixel cells 40$_2$ can be configured to deflect a second input beam to an output port the second set of output ports 16$_B$. Each of the first and second sets 40$_1$, 40$_2$ may comprise a plurality of respective pixel cells. In the configuration of FIG. 5c, the reflective area 20 comprises a plurality of first sets 40$_1$ and a plurality of second sets 40$_2$ of pixel cells in an interleaved or alternating geometry. In particular, a first set 40$_1$ of pixel cells may be surrounded by at least two second sets 40$_2$ of pixel cells, and vice versa.

FIG. 5c shows the resulting phase change (in multiples of $\pi$) for the grating serving the first set of output ports 16$_A$ in solid lines and the resulting phase change for the second set of output ports 16$_B$ in dashed lines, for a configuration with a tilted geometrical normal direction 28". Transitional regions 40$_3$ between the different sets 40$_1$, 40$_2$ of pixel cells are shown in detail on the left-hand side of the drawing only.

Said interleaved sets 40$_1$, 40$_2$ of pixel cells may have at least partial spatial overlap within the sets 40$_3$, and when spatially extending the sets 40$_3$ at the expense of the sets 40$_1$, 40$_2$ in the limiting case full spatial overlap. For the latter limiting case, FIG. 5c illustrates also an LCoS phase grating 38 responsible for the controlled deflection of two beams according to the invention in an optical spectrum slice f. The phase grating is built up by a plurality 40$_3$ of pixel cells, wherein the pixel cells 40$_3$ are configured to deflect a first input beam stemming from the set of input ports to an output port of the first set of output ports 16$_A$ and to deflect a second input beam stemming from the set of input ports to an output port the second set of output ports 16$_8$.

The related switching subunits 8a and 8b are fully superimposed on the switching area 6 to a common unit 8a & 8b, which extends over a continuous area on the switching area 6 of FIG. 1a. Thereby, at a given output fiber, the spectral signal slices collected from different input fibres form a continuous image on the switching plane, such as to avoid anomalies such as spectral ripple and crosstalk.

FIG. 5c provides also a schematic illustration of an LCoS phase grating responsible for the deflection of beams in an optical spectrum slice f in a ($M_A$ & $M_B$)×N WSS, as will be explained further below after the discussion of the FIGS. 7a and 7b.

Figure 6:
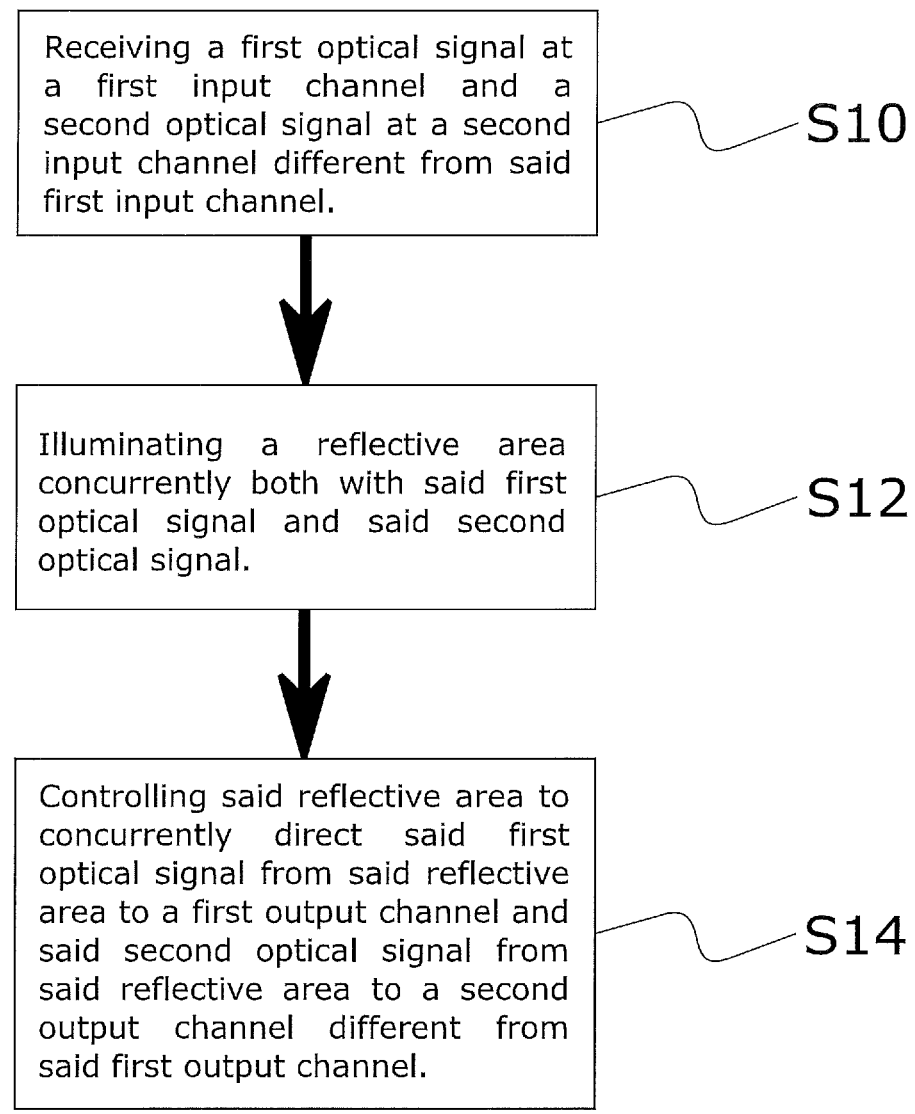
FIG. 6 is a flow diagram illustrating a method for wavelength selective switching according to an embodiment.

FIG. 6 is a flow diagram illustrating a method for wavelength selective switching, in particular employing one of the wavelength selective switches 10, 10', 10", described above with reference to FIGS. 1 to 5.

In a first step S10, a first optical signal is received at a first input path 24$_1$, and a second optical signal is received at a second input path 24$_2$ different from said first input path 24$_1$.

In a second step S12, a reflective area 20 is illuminated concurrently both with said first optical signal and with said second optical signal.

Said reflective area 20 is controlled to concurrently direct said first optical signal from said reflective area 20 to a first output path 30$_1$ and said second optical signal from said reflective area 20 to a second output path 30$_2$ different from said first output path 30$_1$, in step S14. Said first output path and said second output path may be spatially located between by said first input path and said second input path, or vice-versa.

Said first optical signal and said second optical signal may have at least partial spectral overlap, in particular full spectral overlap.

In the examples described above with reference to FIGS. 1 to 6, the wavelength selective switch has been described to comprise a set of input ports 14 sandwiched between two sets of output ports 16$_A$ and 16$_B$. However, one skilled in the art will understand that the optical paths in a wavelength selective switch may be inverted, and hence the distinction between input and output ports is a matter of convention only.

Hence, by systematically inverting the optical paths and exchanging input ports/input paths and output ports/output paths, respectively, examples are obtained of ($M_A$&$M_B$)×N wavelength selective switches, wherein N≥2, $M_A$≥1 and $M_B$≥1. In an example, a first plurality of director units of the reflective area 20 routes incoming signals from the first set of $M_A$ input ports and a second plurality of director units on the reflective area 20 routes incoming optical signals from a second set of $M_B$ input ports, so that the first and second input signals concurrently illuminating the reflective area 20 are directed to respective first and second output ports in the set of N output ports that is spatially located in between said first set of $M_A$ input ports and said second set of $M_B$ input ports. In particular, said first and second plurality of director units spacially overlap partially or fully.

With reference to the configuration of FIGS. 2, 3 and 5c, a given output port 14$_1$ may be fed by grating Section 36$_1$ 40$_1$, for all frequencies, independently of whether the input signal stems from input ports 16$_A$ or 16$_B$. The other port 14$_2$ is fed by grating Section 36$_2$ 40$_2$, for all frequencies, independently of whether the input signal stems from input ports 16$_A$ or 16$_B$.

Figure 7A:
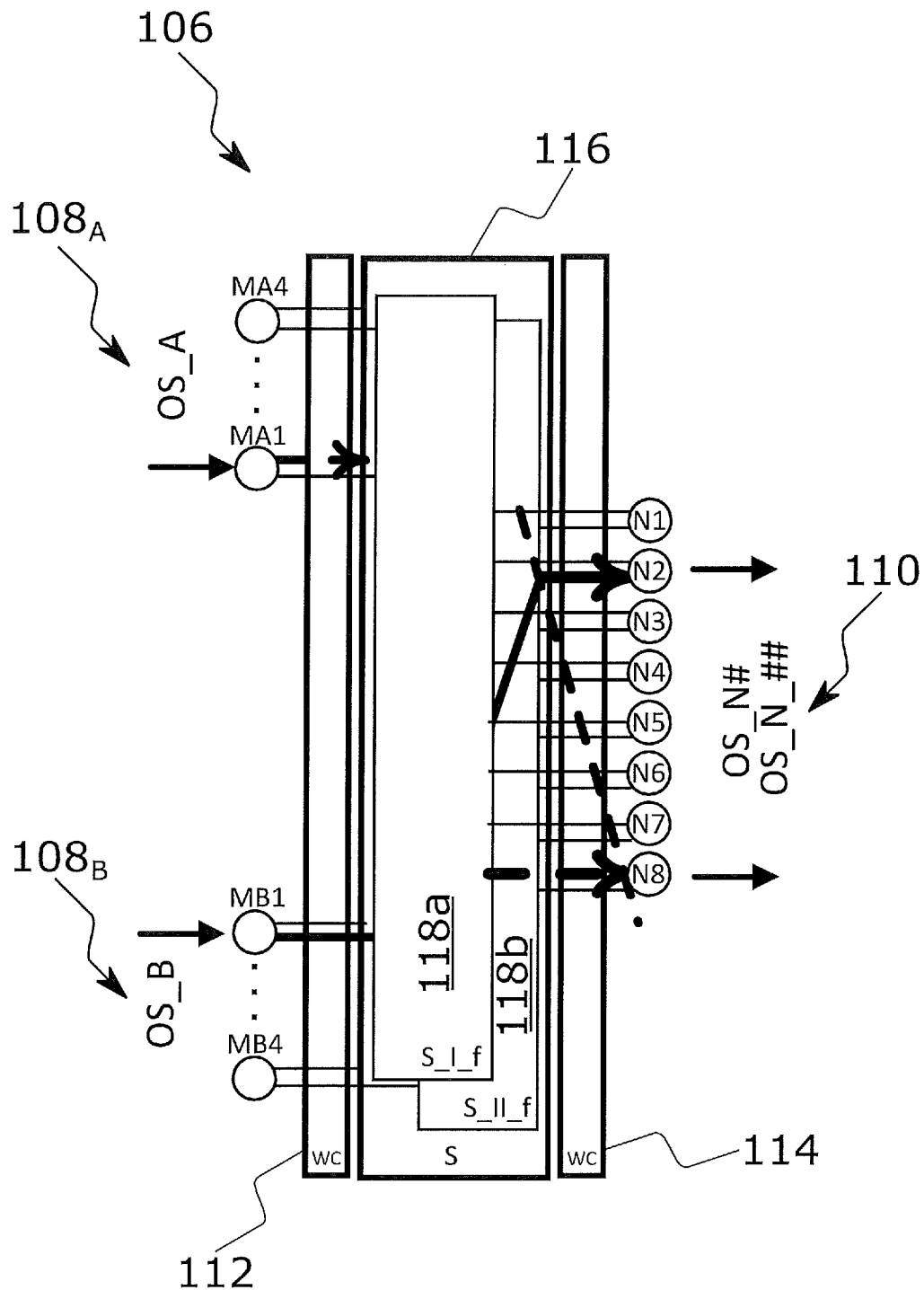
FIG. 7a is a functional diagram of an optical path switching in a ($M_A$ & $M_B$)×N wavelength selective switching device according to an embodiment.
Figure 7B:
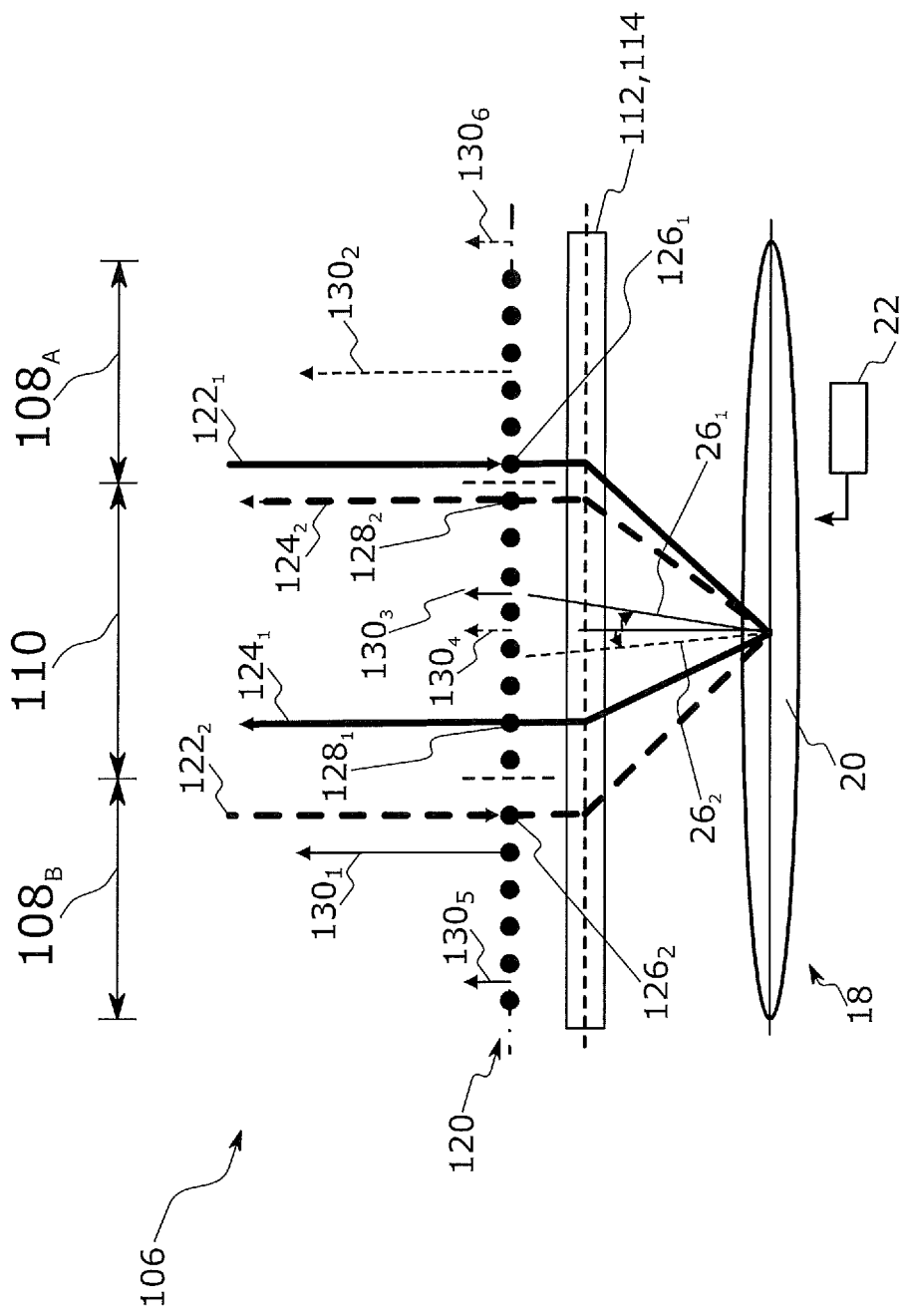
FIG. 7b is a conceptional schematic drawing of the functionality and optical path in a ($M_A$ & $M_B$)×N wavelength selective switching device according an embodiment.

In more detail, FIG. 7a is a schematic illustration of a wavelength selective switching unit 106 that generally corresponds to the representation of FIG. 1a, but shows the inverted path configuration of an ($M_A$ & $M_B$)×N switch with a first set 108$_A$ of four input ports $M_{A1}$ to $M_{A4}$, a second set 108$_B$ of four input ports $M_{B1}$ to $M_{B4}$ and a group of N output ports $N_1$ to $N_8$. The wavelength selective switch 106 comprises a first wavelength selective coupler 112 at the input side and a second wavelength selective coupler 114 at the output side that sandwich a switching plane unit 116 that generally corresponds to the switching plane unit 6 described above with reference to FIG. 1a, with the difference that the directions of the optical signals are interchanged. The switching plane unit 116 may again comprise two switching plane subunits 118a, 118b, that can be distinct, but may also be realized basically in common with the same group of LCoS pixels.

In general, each port $M_A$# of the input port set $M_A$ can carry an incoming dense wavelength division multiplex (DWDM) signal. A first DWDM signal $OS_A$ composed of signal spectral slices selected out of these incoming DWDM signals can be defined and be coupled in a controlled manner to the output port set 110. In FIG. 7a, a first spectral slice $OS_{Af}$ of the first DWDM signal $OS_A$ enters through the input port $M_{A1}$ among the first set of input ports 108$_A$. Not selected signals in the optical spectrum slice f (if present at all) would appear at the output port set at other ports than the spectral slices of the DWDM signal $OS_A$, and can be suppressed by means described in conjunction with FIG. 7b. The first dense wavelength division multiplex (DWDM) signal $OS_A$ enters through the first set of input ports 108$_A$. The wavelength selective coupler 112 in the input path decomposes the DWDM signal $OS_A$ into spectral slices. The path of the spectral slice $OS_{Af}$ in the frequency band f is depicted in FIG. 7a as a dashed line. Similarly, a second DWDM signal $OS_B$ enters through the second set of input ports 108$_B$. The wavelength selective coupler 112 decomposes the DWDM signal $OS_B$ into spectral slices, and the path of the spectral slice $OS_{Bf}$ in the frequency band f is depicted as a solid line.

The spectral slices $OS_{Af}$ and $OS_{Bf}$ in the frequency band f are impinging on the switching plane subunits 118a, 118b, respectively, of the switching plane unit 116. The LCoS switching plane unit 116 imposes a phase retardation on both waves, which is a superposition of the phase ramps that individually direct light of the two incoming wave slices $OS_{Af}$ and $OS_{Bf}$ to the desired two respective output ports 110. The goal is again that at a given output fibre, such as at output fibres $N_2$ and $N_8$, the spectral slices collected from different input fibres faun a continuous image on the switching plane so as to avoid anomalies such as spectral ripple and crosstalk.

The second wavelength selective coupler optics 114 in the output path of the wavelength selective switch 106 superimposes the spectral slices and directs them towards the respective output ports. Because light from both incoming wave slices $OS_{Af}$ and $OS_{Bf}$ experiences the same LCoS phase retardation profile, a fraction of about e.g. one half of the light from a single input port will be directed to the desired output ports, after passing through the wavelength selective coupler optics 114 in the output path of the WSS 106. This half is covered by the functional description that follows below. Another fraction of about one half of the light will be directed to locations determined by the phase retardation profile that couples light from the other input port to its desired output port, after passing through the wavelength selective coupler 114 in the output path of the WSS 106. A remaining fraction can appear in higher diffraction order signals by the combined action of both phase retardation profiles, after passing through the wavelength selective coupler 114. This further half and the remaining fraction are directed away from the outputs, as will be described further below. Overall, each of the N output ports 110 outputs a DWDM signal which contains spectral slices received from the respective first and second sets of input ports 108$_A$, 108$_B$. A system may be configured to direct, within each frequency slot f, up to one input wave to a first output port among the output ports 110, such as output port $N_8$, and up to one other input signal spectral slice to a second output port among the output ports 110, such as output port $N_2$.

FIG. 7b is a schematic illustration of the optical path in the $(M_A \& M_B) \times N$ wavelength selective switch 106 of FIG. 7a. The illustration largely corresponds to the illustration of the $N \times (M_A \& M_B)$ wavelength selective switch 10' described above with reference to FIG. 1c, with the distinction that the directionality of the optical signals is inverted. Hence, corresponding functional elements are denoted with the similar reference numerals in FIGS. 1c and 7b, and a detailed description of these elements will be omitted. As can be taken from FIG. 7b, the wavelength selective switch 106 comprises an array 120 of input ports and output ports in which the first and second sets of input ports $108_A$, $108_E$ sandwich the output ports 110. In other words, the second set of input ports $108_B$ is separated from the first set of input ports $108_A$ by the output ports 110.

The wavelength selective switch 106 directs a first optical signal on a first input path $122_1$ corresponding to a first input port $126_1$ among the first set $108_A$ of input ports to a first output path $124_1$ at a first output port $128_1$ among the set of output ports 110. This exemplary signal path is indicated by a solid line in FIG. 7b. Similarly, the wavelength selective switch 106 converts a second optical signal along a second input path $122_2$ incident on a second input port $126_2$ among the second set of input ports $108_B$ to a second output path $124_2$ at a second output port $128_2$ among the set of output ports 110. This signal path is indicated by a dashed line in FIG. 7b. As can be taken from the schematic illustration of FIG. 7b, the input paths $122_1$, $122_2$ are spatially separated from one another by the output paths $124_1$, $124_2$.

The illustration of FIG. 7b further shows disturber signals $130_1$, $130_3$, $130_5$ caused by the signal incident on input path $122_1$, and disturber signals $130_2$, $130_4$, $130_6$ caused by the signal incident on input path $122_2$. In FIG. 7b, the low order disturber signals are shown by long arrows, and the higher order disturbing signals are shown by shorter arrows. Similarly as described above with reference to FIGS. 1b, 1c and 4, the lower order disturber signals $130_1$, $130_2$ are counter-propagating the respective input signals on signal paths $122_1$, $122_2$, and hence may be easily suppressed. The higher order disturber signals $130_3$, $130_4$, . . . can fall into the range 110 of outputs, but to not directly output ports.

FIG. 5c also provides a schematic illustration of an LCoS phase grating 38 responsible for the deflection of beams in an optical spectrum slice f in a $(M_A \& M_B) \times N$ WSS. By way of example, this is explained for a phase grating that is built up by a plurality $40_3$ of pixel cells. Such pixel cells $40_3$ are configured to deflect an input beam of the first set of input ports $108_A$ to an output port of the set of output ports 110 and simultaneously to deflect a second input beam of the second set of input ports $108_{13}$ to an output port the set of output ports 110.

FIG. 5c shows details of the resulting phase change (in multiples of π) on the left hand side of the diagram (pixels 100 to 150) for a grating serving the set of output ports 110 for a configuration with a tilted geometrical normal direction 28". The pixel cells of region $40_3$ are shown in detail on the left-hand side of the drawing. The region extends over the whole row of pixel cells.

The related switching subunits 118a and 118b are fully superimposed on the switching area 116 to a common unit 118a & 118b, which extends over a continuous area on the switching area 116. Thereby, at a given output fiber of the set of output ports 110, the spectral signal slices collected from different input fibres form a continuous image on the switching plane, such as to avoid anomalies such as spectral ripple and crosstalk in the output signals.

However, similarly as described above with reference to FIGS. 1b, 1c, 4 and 7b, the low order disturber signals $32_1$, $32_2$ $130_1$, $130_2$ (long arrows) are counter-propagating the respective input signals on signal paths $24_1$, $24_2$, $122_1$, $122_2$, and hence may be easily suppressed. Higher order disturber signals $130_3$-$130_6$ (short arrows only shown in FIG. 7b) may appear in the range of output ports and may not be counter propagating, but do not hit any of the output ports carrying configured output signals $124_1$, $124_2$. Hence, also in the $(M_A \& M_B) \times N$ configuration of the wavelength selective switch 106, the spatial separation according to the present invention allows to efficiently suppress disturber signals.

Figure 12A:
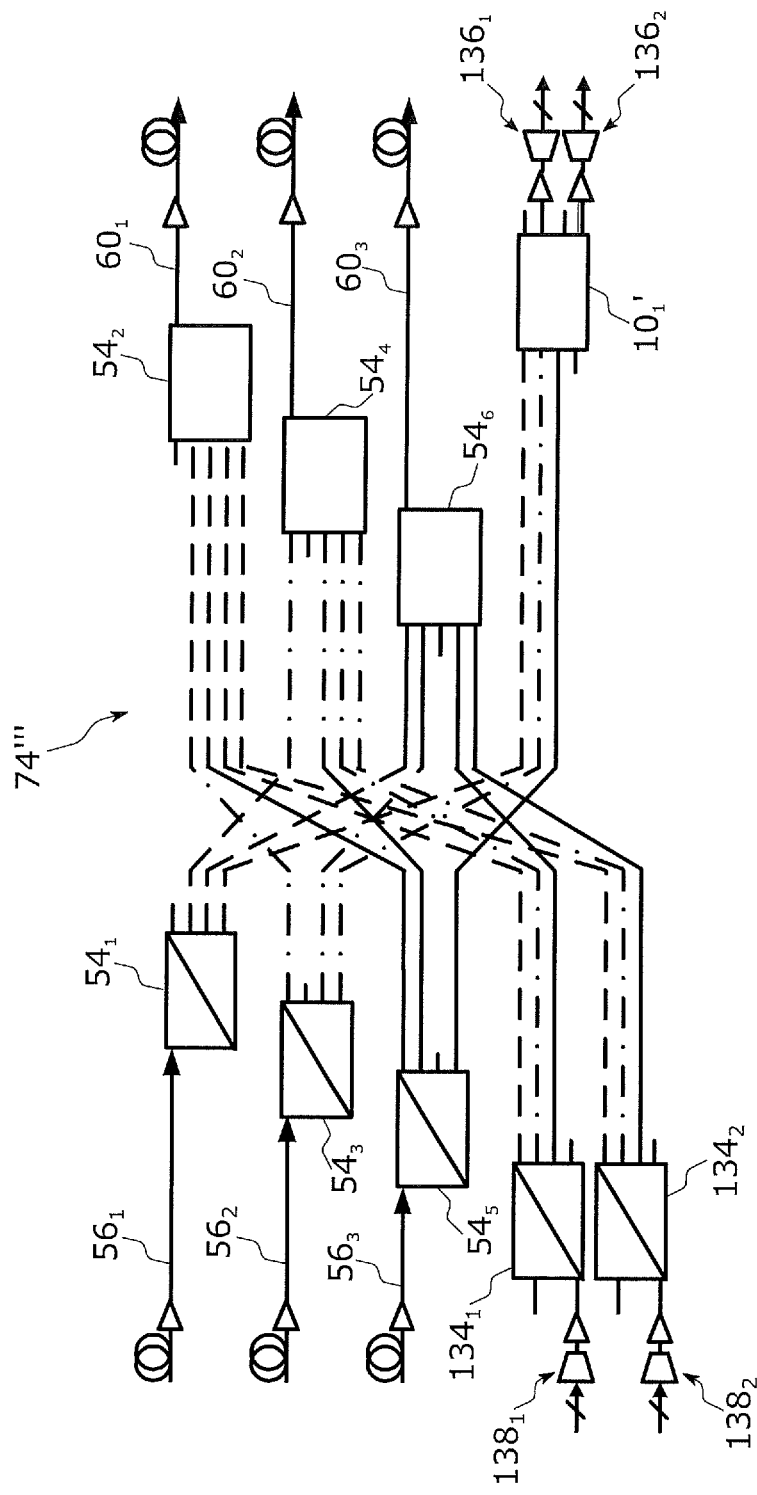
FIGS. 12a, 12b are broadcast and select ROADM structures with colourless and directionless add/drop capability according to an embodiment.
Figure 12B:
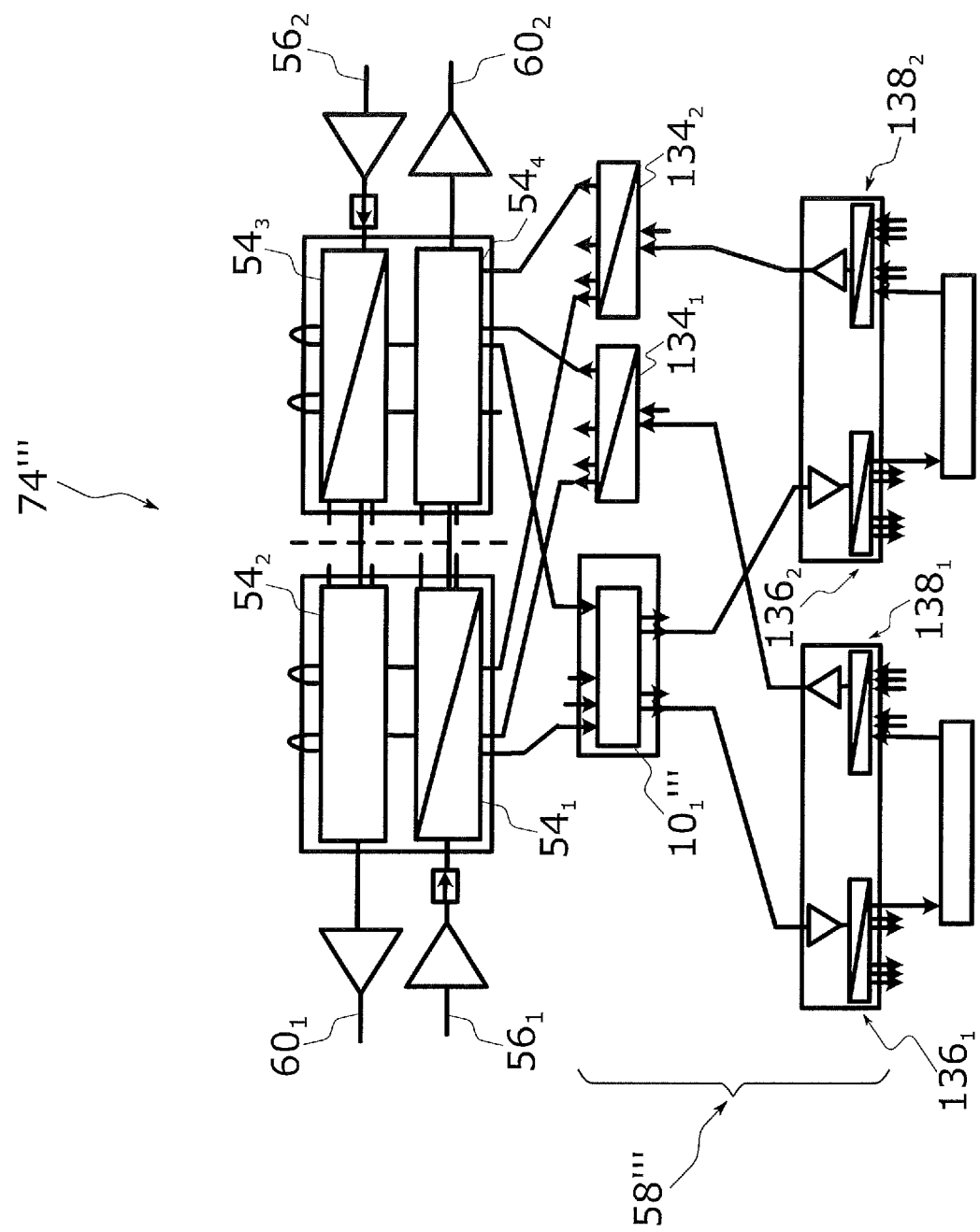

In summary, with reference to the FIG. 1c, the sandwiching of input ports between output ports and the single side extra offset between input and output ports enables $N \times (M_A \& M_B)$ WSS with the following advantages:

For each of the two input signal spectral slices to be configured:
Disturbing output beams may fall into the range of input ports and output ports, but only onto other output ports than the ports configured to be an output port for input signal spectral slices to be routed. Therefore these disturbers can be suppressed by further spatial and wavelength selective means, as already mentioned above and described further below in conjunction with ROADM arrangements.
Particularly disturbing low grating order output beams are not observed in the range of output ports if the first set of output ports and the second set of output ports are sufficiently spaced apart with respect to each other. This finding is reflected by the rule that the first and second set of output ports may comprise a number of output ports being not higher than half the number of input ports.
Operation of such $N \times (M_A \& M_B)$ WSS in a Broadcast & Select ROADM as shown later in the FIGS. 12a and 12b is also possible. In this arrangement, further (disturbing) input signals (at N-type ports) and related output signals from the optical splitters of the ROADM may occur. These disturbing signals can also be suppressed by the further spatial and wavelength selective means, as already mentioned above and described further below in conjunction with ROADM arrangements.

Similarly with reference to FIG. 7b in $(M_A \& M_B) \times N$ WSS, the sandwiching of output ports between input ports and the single side offset between input and output port enables $(M_A \& M_B) \times N$ WSS by solving similar issues as described for $N \times (M_A \& M_B)$. For each of the two input signal spectral slices to be configured:
Disturbing output beams may fall into the range of input ports and output ports, but only onto other output ports than the ports configured to be an output port for input signal spectral slices to be routed. Therefore these disturbers can be suppressed by further spatial and wavelength selective means, as already mentioned above and described further below in conjunction with ROADM arrangements.
Particularly disturbing low grating order output beams are not observed in the range of output ports if the first set of input ports and the second set of input ports are sufficiently spaced apart with respect to each other. This finding is reflected by the rule that the first and second set of input ports may comprise a number of input ports being not higher than half the number of output ports.
Operation of such $(M_A \& M_B) \times N$ WSS may lead to further (disturbing) input signals at $M_A$ and/or $M_B$ type ports and related output signals. These disturbing signals can also be suppressed by the further spatial and wavelength selective means, as already mentioned and described further below in conjunction with ROADM arrangements.

These further means are shown further below in conjunction with ROADM structures employing ($M_A$ & $M_B$)×N and/or N×($M_A$ & $M_B$) WSS. Note: No frequency selective means are needed at $M_A$ type ports for the case $M_A$=1, and $M_B$ type ports for the case $M_B$=1.

The dual input wave group wavelength selective switch according to the present disclosure can be employed in a reconfigurable optical add/drop multiplexer (ROADM) structure to provide a colorless, directionless, and hitless switching that makes more efficient use of the WSS ports, enhances the add/drop capacity and reduces the amount of cabling required between the WSS modules.

Possible uses of the wavelength selective switch in a ROADM structure comprise a N×($M_A$&$M_B$) WSS combining two drop paths and a ($M_A$&$M_B$)×N WSS combining two add paths;

or a N×($M_A$&$M_B$) WSS combining a drop path and a path of a DWDM signal sent out to a transmission fiber, and a ($M_A$&$M_B$)×N WSS combining an add path and a path of a DWDM signal coming in from a transmission fiber;

or an N×($M_A$&$M_B$) WSS combining two DWDM signals sent out to two transmission fibers;

or an ($M_A$&$M_B$)×N WSS combining two DWDM signals coming in from two transmission fibers.

Figure 8:
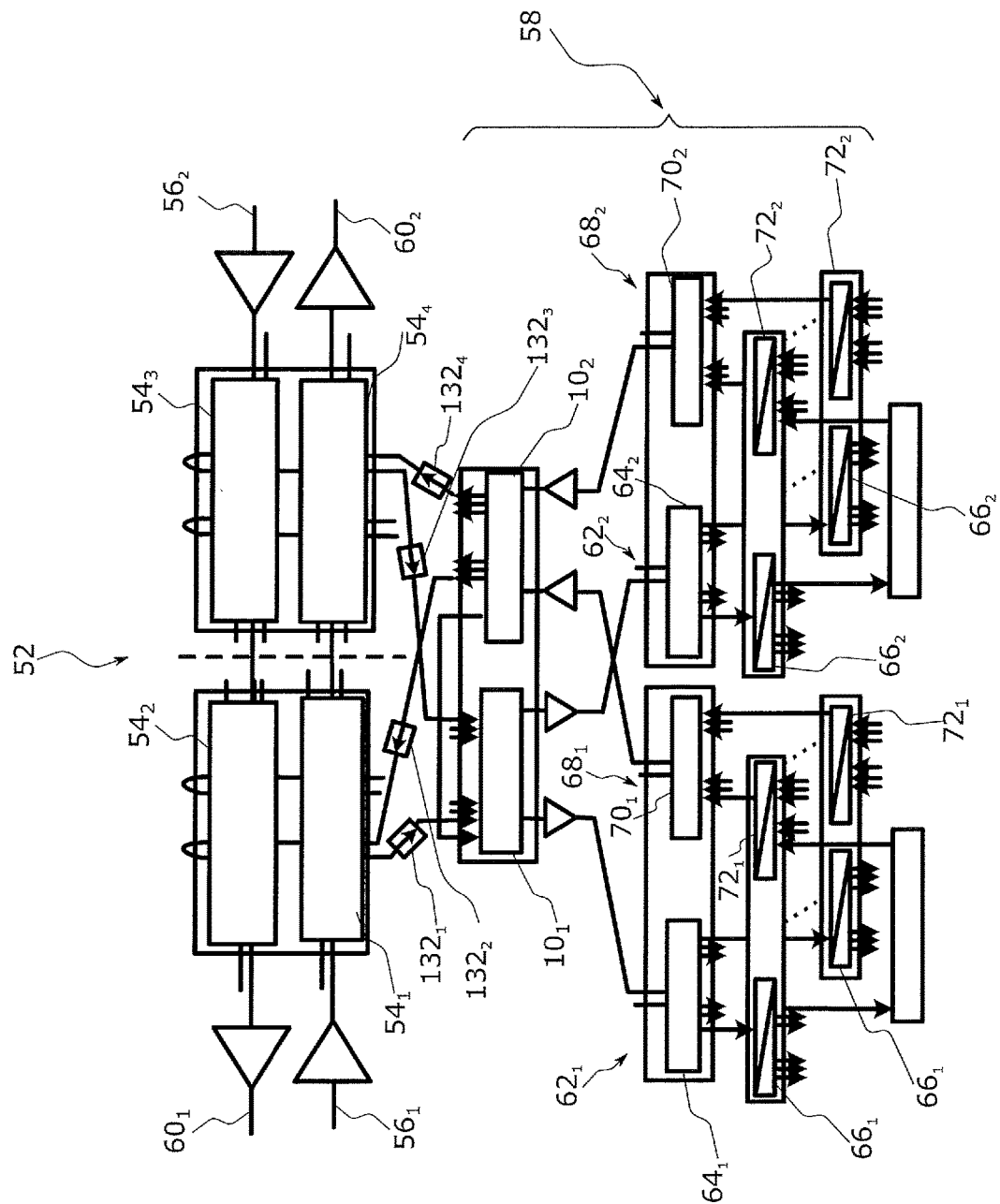
FIG. 8 is a schematic illustration of a ROADM structure with dual-core add/drop functionality according to an embodiment.

FIG. 8 is a schematic illustration of a route and select ROADM 52 with a dual-core colorless and directionless add/drop functionality and a dual-core direction-switching layer. The ROADM 52 comprises a plurality of wavelength selective switch units $54_1$ to $54_4$ that constitute an express layer of the ROADM structure 52. The schematic illustration of FIG. 8 shows four WSS units $54_1$ to $54_4$. However, this is a mere example, and a larger number of WSS units may also be employed. Each of the WSS units $54_1$ to $54_4$ may be a conventional wavelength selective switch.

The input WSS unit $54_1$ is a demultiplexer structure that connects an input transmission fiber $56_1$ selectively to each of the WSS units $54_4$ and (optionally but not shown) $54_2$ and to an add/drop structure 58. Similarly, the input WS S unit $53_3$ is a demultiplexer WSS that connects a second input transmission fiber $56_2$ selectively to each of the WSS units $54_2$, and (optionally but not shown) $54_4$, and to the add/drop structure 58.

The output WSS unit $54_2$ is a multiplexer structure that selectively receives incoming signals from the input WSS units $54_3$ and (optionally but not shown) $54_1$, and from the add/drop structure 58, and directs them into the first output transmission fiber $60_1$. Similarly, the output WSS unit $54_4$ is a multiplexer WSS structure that selectively couples optical signals from each of the input WSS units $54_1$ and (optionally but not shown) $54_3$, and the add/drop structure 58 into a second output transmission fiber $60_2$.

The add/drop structure 58 comprises an N×(1&1) drop WSS unit $10_1$ with some or all of the features described above with reference to FIGS. 1 to 7 for the wavelength selective switches 10, 10', 10". For instance, the drop WSS unit $10_1$ may be a 8×(1&1) wavelength selective switch according to any of the previous embodiments.

The add/drop structure 58 further comprises a (1&1)×N add wavelength selective switch $10_2$ with some or all of the features described above with respect to the embodiments of FIGS. 1 to 7. For instance, the add WSS $10_2$ unit may be a (1&1)×8 wavelength selective switch as described above.

The WSS units $10_1$, $10_2$ are connected to the respective WSS units $54_1$ to $54_4$ by isolator units $132_1$ to $132_4$ that may suppress or filter out counter-propagating signals. The pass direction of the isolator units $132_1$ to $132_4$ is indicated by an arrow in the diagram of FIG. 8.

The add/drop structure 58 further comprises first and second demultiplexing structures $62_1$, $62_2$, wherein each demultiplexing structure $62_1$, $62_2$, comprises a demultiplexing wavelength selective switch $64_1$, $64_2$ coupled to the drop WSS unit $10_1$, and a plurality of optical power splitters $66_1$, $66_2$, respectively. Other demultiplexer structures are also possible, such as a splitter followed by wavelength selective switches or a fixed frequency demultiplexer filter. A demultiplexing structure without WSS $64_1$ or without WSS $64_2$ is possible, too. Power splitter $66_1$, $66_2$ output ports connect to first and second transponders $140_1$, $140_2$ having wavelength selective receivers.

The add direction of the add/drop structure 58 has two multiplexing structures $68_1$ and $68_2$, respectively, which are coupled to the add WSS unit $10_2$. In the example of FIG. 8, each of the multiplexing structures $68_1$, $68_2$, comprises a multiplexing wavelength selective switch $70_1$, $70_2$, respectively, whose respective inputs are coupled to a plurality of optical power combiners $72_1$ and $72_2$, respectively. Other multiplexing structures are possible, such as a WSS coupled to a power combiner, or a fixed frequency multiplexing filter.

The tributary ports of each demultiplexing structure $62_1$, $62_2$, and multiplexing structure $68_1$, $68_2$, typically are coupled to optical line interfaces with receivers supporting coherent channel selection. Two such line interfaces are shown at the bottom of FIG. 8. Optical amplifiers are shown by triangles without filling in FIG. 8 and other Figures, but are not described further. In some examples, additional or ancillary optical devices such as amplifiers, circulators, couplers, detectors, filters, isolators, monitors, polarizers, switches of variable optical attenuators may be employed in the optical paths of the ROADM structure 52 of FIG. 8 and ROADM structures presented in further Figures, but are not shown in the schematic illustration of FIG. 8 and the further Figures so as not to clutter the drawings.

The add/drop structure 58 employing wavelength selective switches $10_1$, $10_2$, supports transportation of the same channel frequency two times and enhances the add/drop capacity over prior art ROADM structures. For instance, for an express path with 9 ports usable for express or add/drop interconnection, the ROADM structure 52 achieves a 100% add/drop up to a nodal degree 6.

Figure 9A:
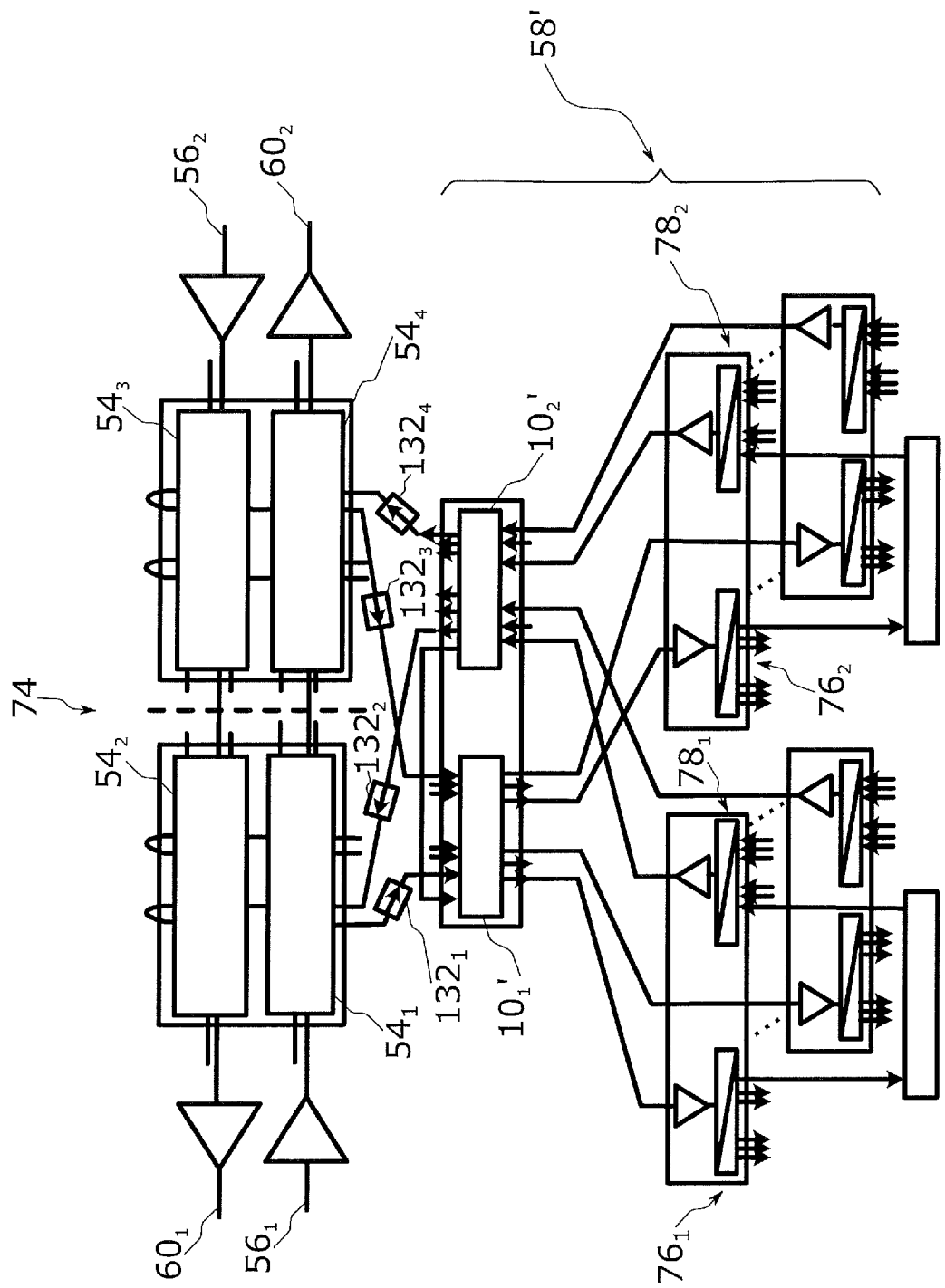
FIGS. 9a-9c are schematic illustrations of ROADM structures with dual-core direction switching and aggregating layer according to embodiments.

FIG. 9a is a schematic illustration of a ROADM structure 74 according to another embodiment. The ROADM structure 74 is generally similar to the ROADM structure 52 described above with reference to FIG. 8, and in particular shares the same express layer. Hence, the same reference numerals are employed to designate corresponding parts.

However, the add/drop structure 58' of the ROADM structure 74 differs from the add/drop structure 58 described above with reference to FIG. 8 in that it comprises an 8×(4&4) drop WSS $10_1$' and a (4&4)×8 add WSS $10_2$', wherein each of the WSS $10_1$' and $10_2$' can be chosen as a wavelength selective switch with some or all of the features described above in the embodiments of FIGS. 1 to 7.

The higher number of port counts in the drop WSS $10_1$' and in the add WSS $10_2$', when compared to the configuration of FIG. 8, provides an aggregating layer and allows to simplify both the demultiplexing structures $76_1$, $76_2$ of the add/drop structure 74 and the multiplexing structures $78_1$, $78_2$, of the add/drop structure to rely on optical power splitters and combiners only. Demultiplexing/power splitter $76_1$, $76_2$ output ports connect to first and second transponders $140_1$ $140_2$ having wavelength selective receivers.

The ROADM structure 74 of FIG. 9a allows to significantly enhance the add/drop capacity. For instance, for an express path with 1×20 WSS and N×($M_A$&$M_B$) drop WSS $10_1$' and ($M_A$&$M_B$)×N add WSS $10_2$', with 12×8 WSS, a 100% add/drop capacity can be achieved up to a nodal degree 12, a significant improvement over what can be achieved with the prior art.

Figure 9B:
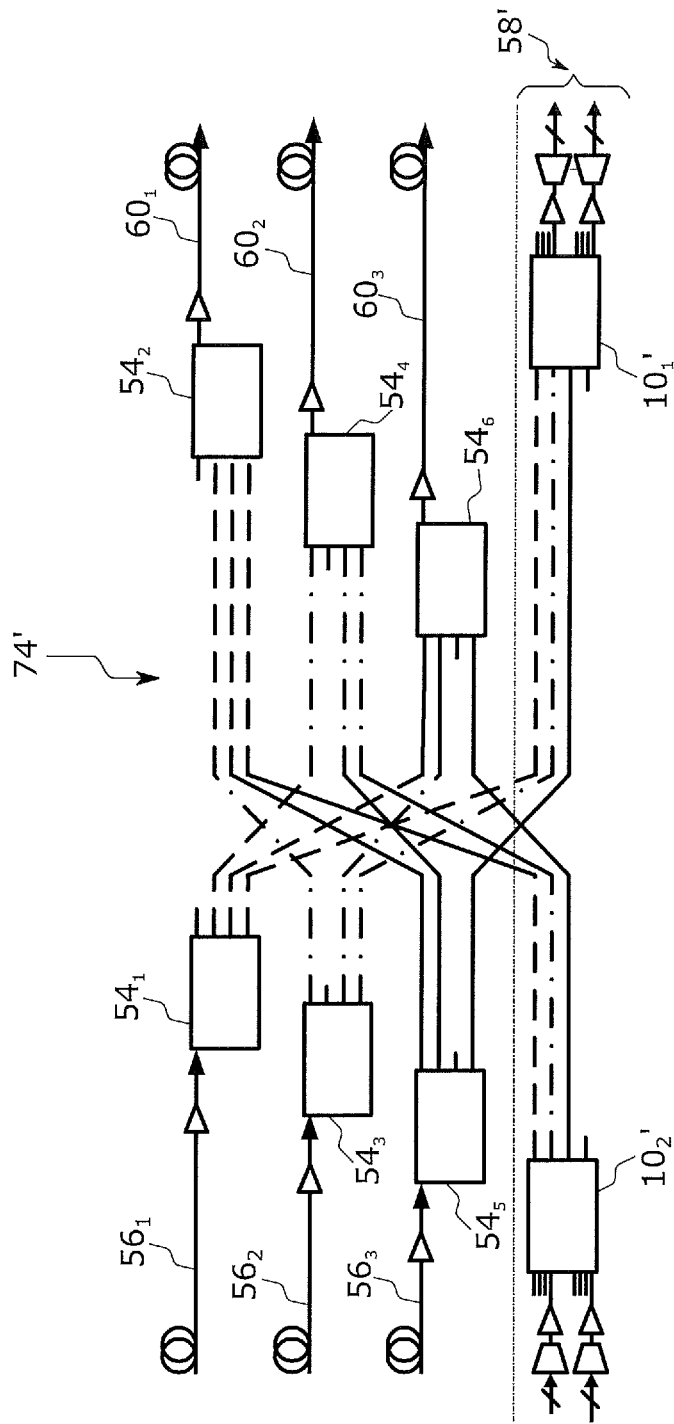

The representation of FIG. 9b is an alternative to the representation of FIG. 9a, but shows essentially the same ROADM structure 74', except that the structure 74' comprises an additional input WSS unit $54_5$ coupled to an additional input transmission fiber $56_3$, and an additional output WSS unit $54_6$ coupled to an additional output transmission fiber $60_3$. The drop WSS $10_1$' and the add WSS $10_2$' generally correspond to the configuration explained above with reference to FIG. 9a.

The configuration shown in FIG. 9b establishes a ROADM with a route & select or broadcast & select express layer coupled to a colourless and directionless add/drop structure (CD-AD). This ROADM supports the same channel frequency two times. The drop direction of this CD-AD comprises a direction switching and aggregating N×($M_A$ & $M_B$) WSS $10_1$' according to the embodiments described above. Two demultiplexing structures are coupled to the direction switching and aggregating N×($M_A$ & $M_B$) WSS. In the embodiment, each demultiplexing structure may comprise an optical power splitter, but other demultiplexing structures are likewise feasible. The add direction of the CD-AD structure has two multiplexing structures coupled to aggregating and direction-switching ($M_A$ & $M_B$)×N WSS $10_2$' according to the embodiments described above. For instance, each multiplexing structure may comprise power combiners coupled to a WSS, but other multiplexing structures are likewise possible. The ($M_A$ & $M_B$)×N WSS $10_2$' and N×($M_A$ & $M_B$) WSS $10_1$' each may have about equal coupling ratio for the two add/drop tree lines.

Figure 9C:
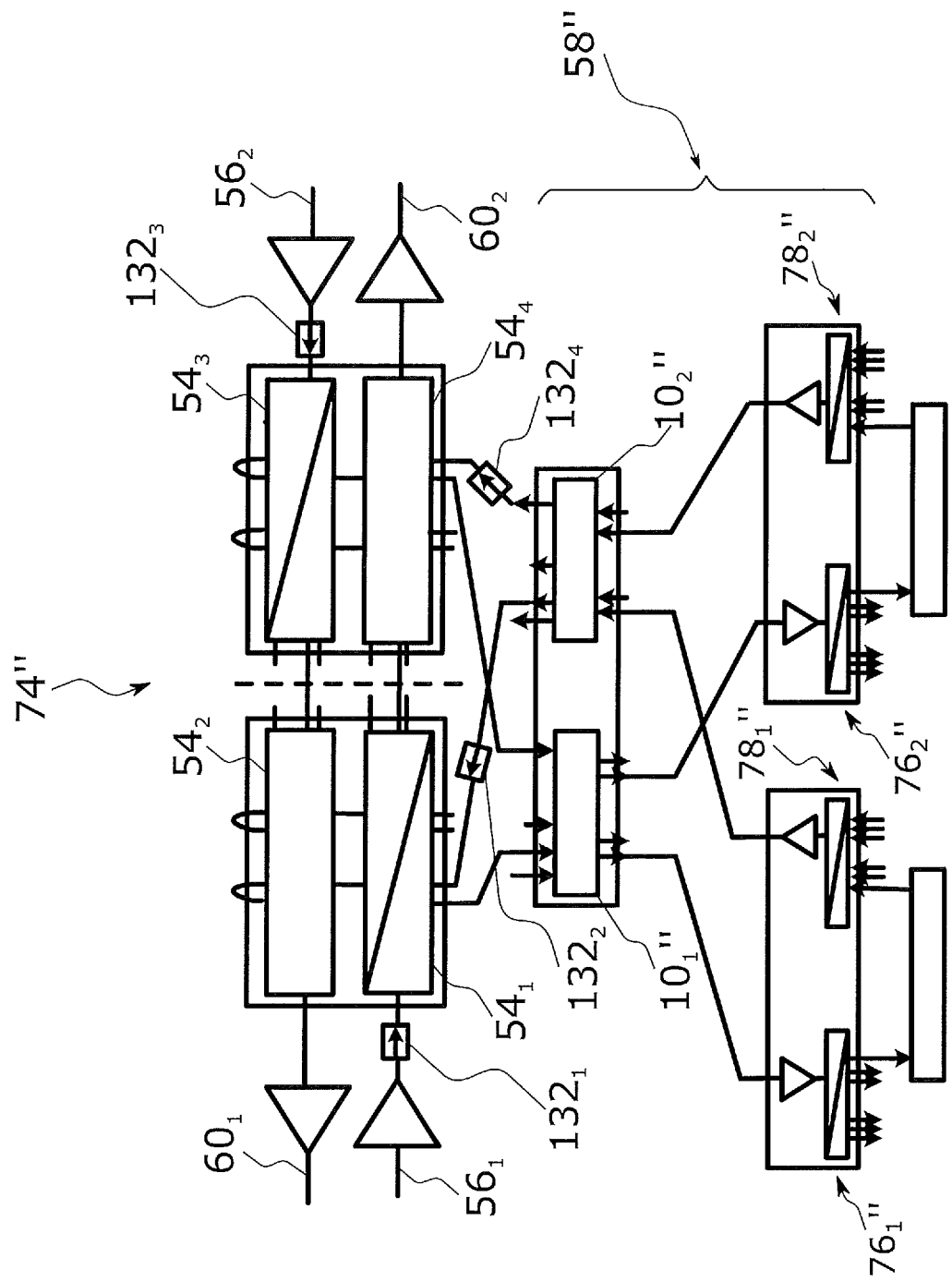

FIG. 9c is a schematic illustration of a ROADM structure 74" that is generally similar to the configurations explained above with reference to FIGS. 9a and 9b, and corresponding components share the same reference signs. However, the ROADM 74" has in the express path a broadcast & select architecture. Compared to the configuration of FIG. 9b, an optical splitters $54_1$ and $54_3$ are used. And compared to the configuration of FIG. 9a the ROADM structure 74" has simplified demultiplexing structures $76_1$", $76_2$" and multiplexing structures $78_1$", $78_2$". Moreover, the isolators $132_1$ and $132_3$ are moved to the input transmission fibres $56_1$ and $56_2$, respectively.

In the embodiments described with reference to FIGS. 8 and 9, the add/drop functionality of the ROADM structure involves separate add/drop structures 58, 58', and 58" comprising the dual-core wavelength selective switches according to the present invention. However, in alternative embodiments the add/drop paths may be incorporated into the express layer so as to further enhance the add/drop capacity.

Figure 10A:
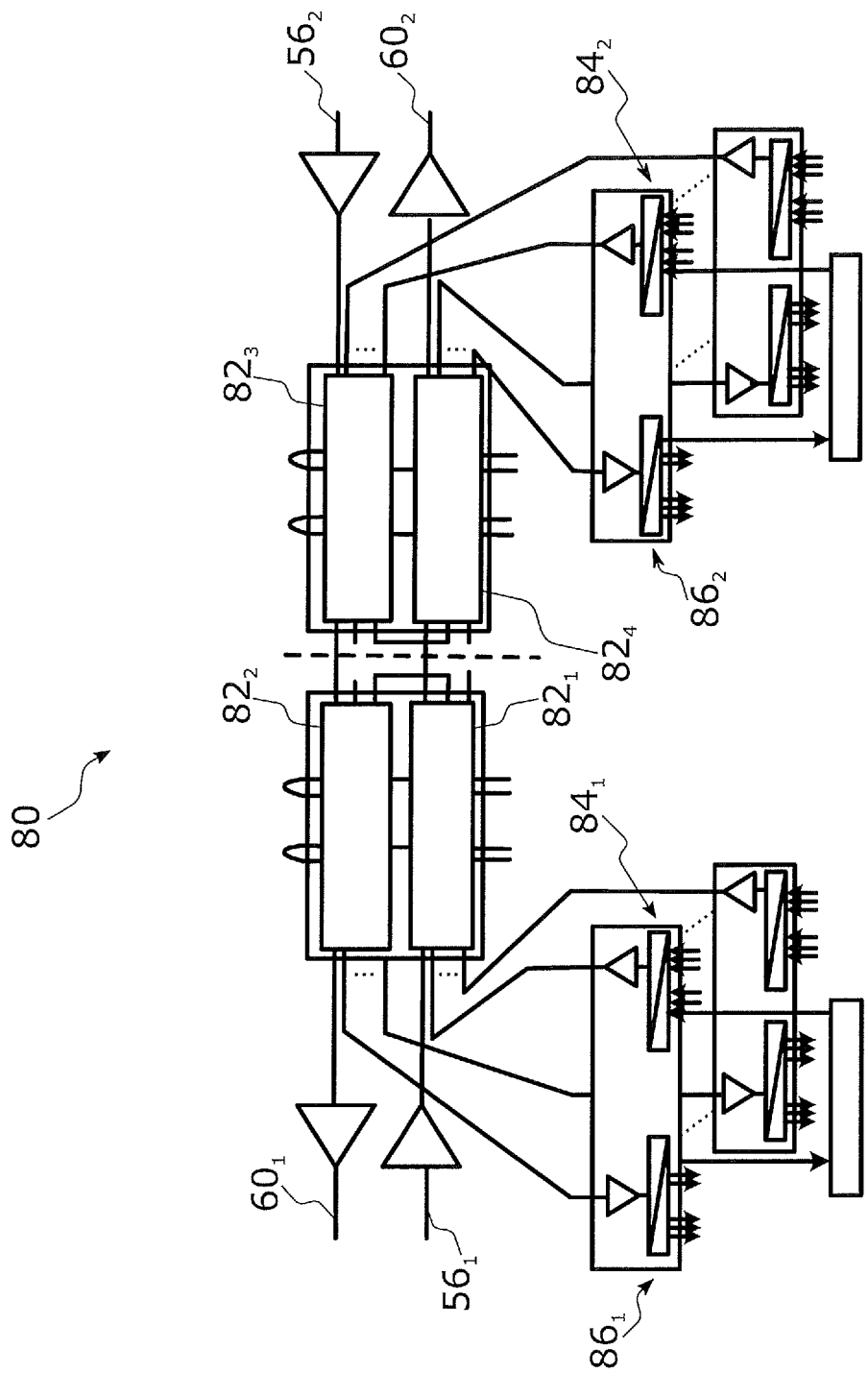
FIGS. 10a, 10b are schematic illustrations of ROADM structures with an add/drop functionality incorporated into the express layer according to embodiments.

FIG. 10a schematically illustrates a ROADM structure 80 combining in a wavelength selective switch a drop path and a path of a DWDM signal sent out to a transmission fiber, and combining in a wavelength selective switch an add path and a path of a DWDM signal coming in from a transmission fiber.

In more detail, the ROADM structure 80 comprises a plurality of WSS units $82_1$ to $82_4$, wherein each of the WSS units $82_1$ to $82_4$ can be a wavelength selective switch unit with some or all of the features of the wavelength selective switches 10, 10', 10" described above with reference to FIGS. 1 to 7.

In particular, the input wavelength selective switch units $82_1$ and $82_3$ may be (1&$M_B$)×N wavelength selective switches, such as (1&4)×9 wavelength selective switches. The input WSS unit $82_1$ is connected to the first input transmission fiber $56_1$ for receiving a DWDM input signal, and is further connected to a combiner structure $84_1$ that allows to add DWDM signals to the WSS unit $82_1$.

Similarly, the input WSS unit $82_3$ is connected to the input transmission fiber $56_2$ for receiving an incoming DWDM signal, and is further connected to a second combiner structure $84_2$ for adding additional DWDM signals to the WSS unit $82_3$.

The output WSS unit $82_2$ is connected to the first output transmission fiber $60_1$ for emitting a DWDM signal, and is further connected to a first splitter structure $86_1$ for dropping selected DWDM signals. The drop path output port of the splitter structure $86_1$ connect to a first transponder $140_1$ having wavelength selective receivers.

Similarly, the output WSS unit $82_4$ is connected to the second output fiber $60_2$ for outputting DWDM signals, and is further connected to a second splitter structure $86_2$ for dropping selected DWDM signals. A drop path output port of the splitter structure $86_2$ connect to a second transponder $140_2$ having wavelength selective receivers.

Figure 10B:
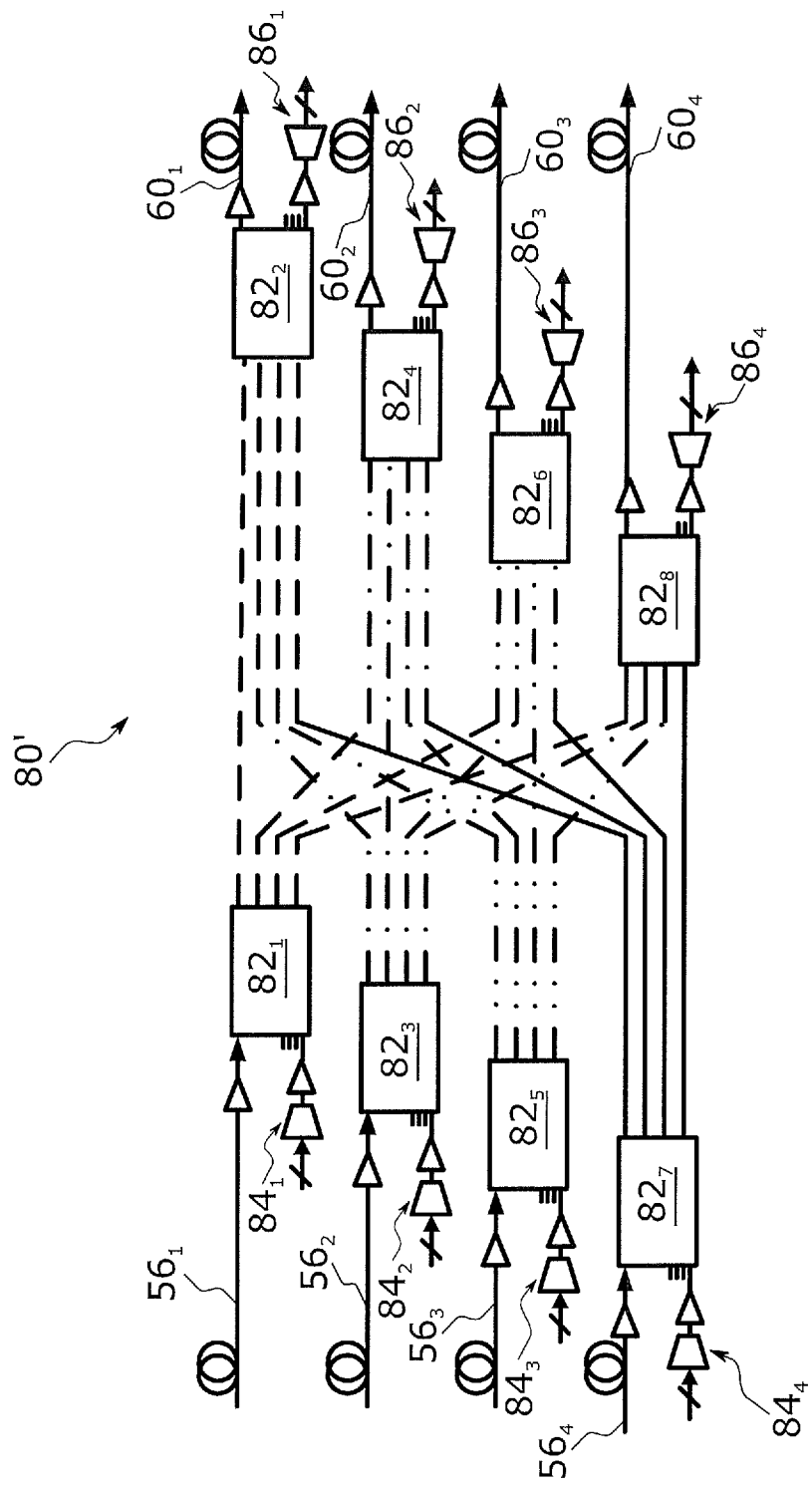

FIG. 10b shows a ROADM structure 80' in an alternative representation. The ROADM structure 80' generally corresponds to the ROADM structure 80 described above with reference to FIG. 10a, but comprises two additional input WSS units $82_5$ and $82_7$ and two additional output WSS units $82_6$ and $82_8$.

The input WSS unit $82_5$ is connected to a third input transmission fiber $56_3$ and to a third combiner structure $84_3$. The input WSS unit $82_7$ is connected to a fourth input transmission fiber $56_4$ and a fourth combiner structure $84_4$.

The output WSS unit $82_6$ is connected to a third output transmission fiber $60_3$ and to a third splitter structure $86_3$. Similarly, the output WSS unit $82_8$ is connected to a fourth output transmission fiber $60_4$ and to a fourth splitter structure $86_4$.

In the configuration of FIGS. 10a and 10b, the input (1&$M_B$)×N WSS units $82_1$, $82_3$, $82_5$, $82_7$, are switchably connected to the corresponding output N×(1&$M_B$) WSS units $82_2$, $82_4$, $82_6$, $82_8$, allowing for switching in the ROADM express layer and for a directionless, colorless, and hitless switching with full add/drop capability incorporated into the express layer.

The ROADM structure 80 and 80' of the FIGS. 10a and 10b allow to significantly enhance the add/drop capacity. For instance, the FIG. 10b shows a ROADM employing four WSS pairs according to the invention connecting four transmission fiber pairs and four colorless directionless add/drop trees, a significant improvement over what can be achieved with the prior art.

The WSS switching units $82_1$ to $82_8$ may be chosen with an asymmetric coupling ratio, leading to a low loss in the express path and a correspondingly higher loss in the add/drop path. Advantageously, variable optical attenuation is possible per channel.

Figure 11:
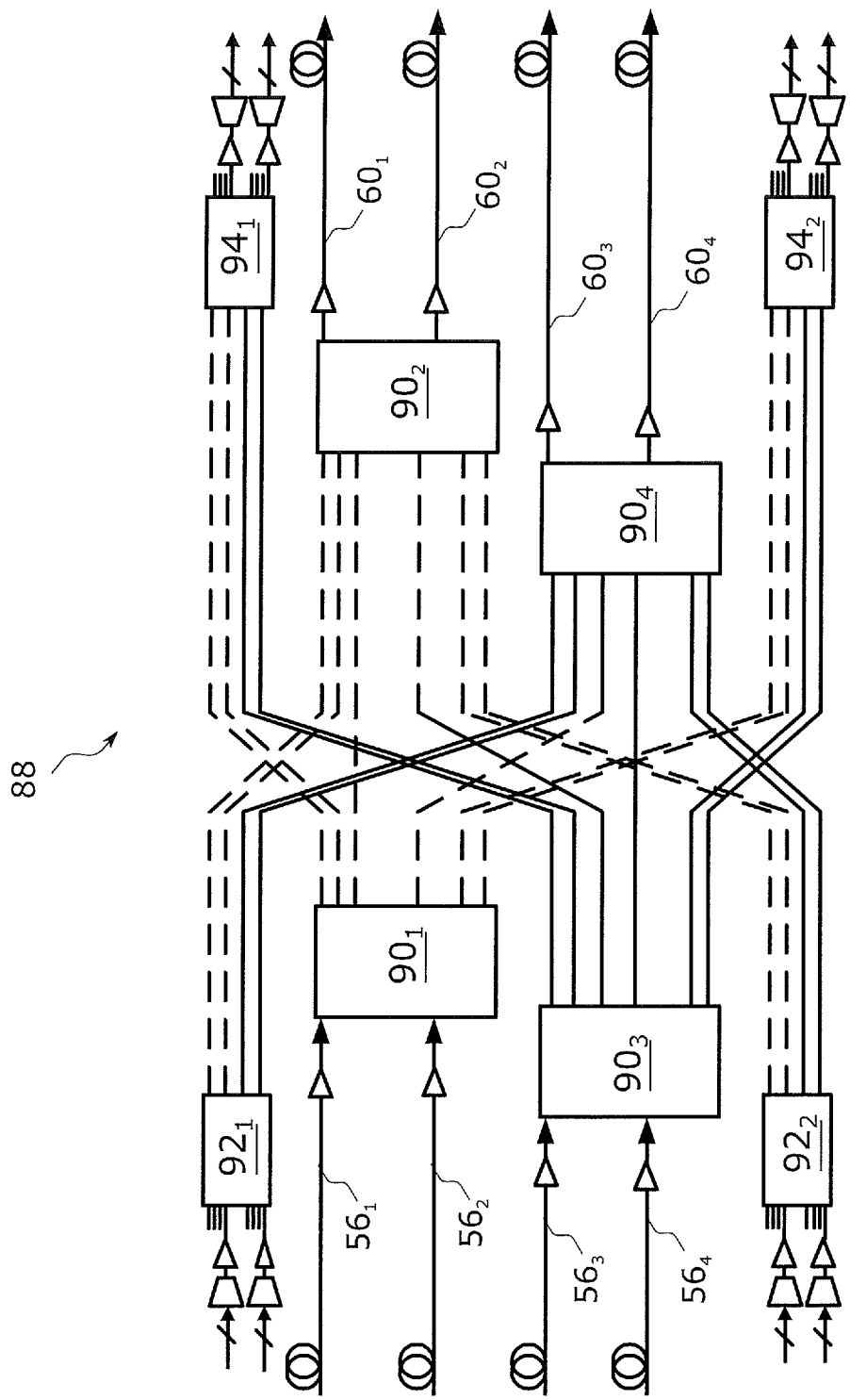
FIG. 11 is a schematic illustration of a ROADM structure having a dual-core wavelength selective switch to independently route and select two DWDM channel sets through the ROADM express layer.

FIG. 11 is a schematic illustration of a ROADM structure 88 with wavelength selective switches that combine two DWDM signals coming in from two optical transmission fibers, and with wavelength selective switches combining two DWDM signals sent out to two transmission fibers. This ROADM structure 88 may be of particular interest if several fibers connecting to a given location are provided in one and the same cable.

This ROADM structure 88 may also be of particular interest if spatial division multiplex (SDM) fibers such as weakly multimode fibers or multicore fibers connect to the ROADM via spatial mode splitters and combiners. An SDM fiber can carry several DWDM channel sets. A spatial mode splitter can separate DWDM channel sets onto (single-mode) fibers $56_1$, $56_2$, $56_3$, $56_4$ for incoming signals; and DWDM channel sets carried by fibers $60_1$, $60_2$, $60_3$ and $60_4$ for outgoing signals can be combined by spatial mode combiners. A ROADM with $(M_A \& M_B) \times N$ WSS and $N \times (M_A \& M_B)$ WSS units according to the invention can efficiently parallel process DWDM channel sets in SDM transmission. Such ROADM can additionally switch a DWDM channel set travelling in e.g. higher order mode of a multimode fiber to another order mode of another multimode fiber. Failing of a WSS affects transmission via the attached transmission fiber the WSS is connecting to, but does not affect the transmission via other fibers attached to the ROADM.

In one embodiment, the ROADM output port pair of a WSS $90_2$, $90_4$ . . . is connected to ports of two different spatial mode combiners and the related SDM fibers. The ROADM input ports are arranged accordingly.

In another embodiment, the ROADM output port pair of a WSS $90_2$, $90_2$ . . . is connected to ports of one spatial mode combiner and the related SDM fiber. The ROADM input ports are arranged accordingly. In this case residual crosstalk introduced by the WSS can be mitigated together with other modal crosstalk occurring along the SDM optical transmission path by digital signal processing in the down-stream transponder at the end of the optical path of an optical signal channel.

In more detail, the ROADM structure 88 of FIG. 11 comprises a plurality of express layer WSS units $90_1$ to $90_4$, a plurality of add WSS units $92_1$, $92_2$, and a plurality of drop WSS units $94_1$, $94_2$, wherein each of the WSS units $90_1$ to $90_4$, $92_1$, $92_2$, and $94_1$, $94_2$, may be chosen as a wavelength selective switch 10, 10', 10", in accordance with the examples discussed above with reference to FIGS. 1 to 7.

In particular, the input WSS units $90_1$, $90_3$, may be selected as $(1 \& 1) \times N$ wavelength selective switch units, and the output WSS units $90_2$ and $90_4$ as $N \times (1 \& 1)$ WSS units. In this way, the WSS unit $90_1$ may be connected to first and second input transmission fibers $56_1$, $56_2$, and the input WSS unit $90_3$ may be connected to the third and fourth input transmission fibers $56_3$ and $56_4$.

The output WSS unit $90_2$ can be connected to the first and second output transmission fibers $60_1$, $60_2$, and the output WSS unit $90_4$ can be connected to the third and fourth output transmission fibers $60_3$, $60_4$, respectively.

The add/drop functionality is provided by means of the separate add WSS units $92_1$, $92_2$, and drop WSS units $94_1$, $94_2$. Each of the add WSS units $92_1$, $92_2$ may correspond in design and functionality to the add WSS units $10_2$, $10_2'$, described above with reference to FIGS. 8, 9a and 9b. Each of the drop WSS units $94_1$, $94_2$ may correspond in design and functionality to the drop WSS units $10_1$, $10_1'$, described above with reference to FIGS. 8, 9a and 9b.

FIGS. 12a and 12b are schematic illustrations of broadcast & select ROADM structures 74''' that implement a $4 \times (2 \& 2)$ WSS unit $10_1'$ according to an embodiment. The structures 74' are generally similar to the ROADM structures 74, 74' described with reference to FIGS. 9a and 9b above, and corresponding components share the same reference signs. The add/drop structure 58''' of the ROADM structure 74''' comprises a $4 \times (2 \text{ and } 2)$ WSS unit $10_1'''$ that generally corresponds to the WSS units described above with reference to the embodiments of FIGS. 1 to 11. The add/drop structure 58" further comprises, in the add path, two $2 \times 4$ star coupler units $134_1$, $134_2$.

The output ports of the drop WSS unit $10_1'''$ are coupled to demultiplexing structures $136_1$, $136_2$ that are similar in design and functionality to the demultiplexing structures $76_1$, $76_2$ described above with reference to FIG. 9a. Drop path output ports of the demultiplexing structures $136_1$, $136_2$ are connected to transponders $140_1$, $140_2$ having wavelength selective receivers. The input ports of the star coupler units $134_1$, $134_2$ are connected to multiplexing structures $138_1$, $138_2$, respectively, that are similar in design and functionality to the multiplexing structures $78_1$, $78_2$ explained above with reference to FIG. 9a.

The configuration shown in FIGS. 12a, 12b allows for an efficient broadcast & select ROADM with colourless and directionless add/drop capability while relying to a large extent on conventional and low cost components, and thereby provides a particularly cost-efficient implementation of a ROADM structure according to the present invention.

The description of the embodiments and the figures merely serve to illustrate the invention, but should not be understood to imply any limitation. The scope of the invention is to be determined from the appended claims.

REFERENCE SIGNS

2 first wavelength selective coupler
4 second wavelength selective coupler
6 switching plane unit
8a, 8b switching plane subunits of switching plane unit 6
10, 10', 10" wavelength selective switch
$10_1$, $10_1'$, $10_1''$, $10_1'''$ drop WSS unit
$10_2$, $10_2'$, $10_2''$ add WSS unit
12, 12' array of input ports and output ports
14 set of input ports
$14_1$-$14_4$ input ports
$14_1'$ input port
$16_A$, $16_B$ first and second sets of output ports
$16_1$, $16_2$ outputs ports
$16_1'$ output port
18 reflective switching unit
20 reflective area of switching unit 18
22 control unit
$24_1$, $24_2$ input paths
$24_1'$ input path
$26_1$, $26_2$ bisecting lines
$26_1''$, $26_2''$ bisecting lines
28, 28" geometrical normal direction
$30_1$, $30_2$ output paths
$30_1'$ output path
$32_1$, $32_2$ disturber signals
34, 34" LCoS phase grating
$36_1$, $36_2$ groups of LCoS pixel cells
$36_1''$, $36_2''$ groups of LCoS pixel cells
38 interleaved LCoS phase grating
$40_1$, $40_2$ interleaved sets of LCoS pixel cells
$40_3$ transition region between sets $40_1$, $40_2$
52 ROADM structure
$54_1$-$54_6$ WSS units of ROADM structure 52
$56_1$-$56_4$ input transmission fibers
58, 58', 58", 58''' add/drop structure
$60_1$-$60_4$ output transmission fibers
$62_1$, $62_2$ demultiplexing structures of add/drop structure 58

64₁, 64₂ demultiplexing WSS of add/drop structure 58
66₁, 66₂ optical power splitters of add/drop structure 58
68₁, 68₂ multiplexing structures of add/drop structure 58
70₁, 70₂ demultiplexing WSS of add/drop structure 58
72₁, 72₂ optical power combiners of add/drop structure 58
74, 74', 74", 74''' ROADM structure
76₁, 76₂ demultiplexing structures of add/drop structure 74
78₁, 78₂ multiplexing structures of add/drop structure 74
76₁", 76₂" demultiplexing structures of add/drop structure 74"
78₁", 78₂" multiplexing structures of add/drop structure 74"
80, 80', 80" ROADM structure
82₁ 82₈ WSS units of ROADM structure 80, 80'
84₁ 84₄ combiner structures
86₁ 86₄ splitter structures
88 ROADM structure
90₁ 90₄ express layer WSS units of ROADM structure 88
92₁, 92₂ add WSS units of ROADM structure 88
94₁, 94₂ drop WSS units of ROADM structure 88
96 WSS switching arrangement
98 polarisation diversity optics module
100 imaging mirror
102 imaging optics unit
104 diffraction grating unit
106 wavelength selective switch
108 first set of input ports
108_A, 108_B first and second sets of input ports
110 output ports
110_A, 110_E first and second sets of output ports
112 first wavelength selective coupler
114 second wavelength selective coupler
116 switching plane unit
118a, 118b switching plane subunits of switching plane unit 116
120 array of input ports and output ports
122₁, 122₂ input paths
124₁, 124₂ output paths
126₁, 126₂ input ports
128₁, 128₂ output ports
128₁, 128₂ output ports
130₁-130₆ disturber signals
132₁-132₄ isolator units
134₁, 134₂ star coupler units
136₁, 136₂ demultiplexing structures
138₁, 138₂ multiplexing structures
140₁, 140₂ transponders with wavelength selective receiver

The invention claimed is:

1. A wavelength selective switching device, comprising:
a plurality of input paths for receiving optical signals;
a plurality of output paths for emitting said optical signals; and
a switching unit for selectively directing said optical signals from said input paths to said output paths;
wherein said switching unit comprises a reflective area at least a first director unit and a second director unit;
wherein each of said first director unit and said second director unit is adapted to be concurrently illuminated by both a first optical signal and a second optical signal, said first optical signal being from a first input path among said plurality of input paths and said second optical signal being from a second input path among said plurality of input paths, said second input path being different from said first input path;
wherein said first director unit does not enable said concurrent illumination of said second director unit and said second director unit does not enable said concurrent illumination of said first director unit;
wherein said first director unit and said second director unit are adapted to use said concurrent illumination of said first director unit and said second director unit to concurrently direct said first optical signal to a first output path among said plurality of output paths and said second optical signal to a second output path among said plurality of output paths, said second output path being different from said first output path;
wherein said first output path and said second output path are spatially separated according to one of:
said first output path and said second output path are spatially separated by said first input path and said second input path;
said first input path and said second input path are spatially separated by said first output path and said second output path.

2. The wavelength selective switching device according to claim 1, wherein said first output path and said second output path are spatially disposed according to one of:
said first output path and said second output path sandwich said first input path and said second input path along a linear array formed by said first output path, said second output path, said first input path, and said second input path;
said first input path and said second input path sandwich said first output path and said second output path along a linear array formed by said first output path, said second output path, said first input path, and said second input path.

3. The wavelength selective switching device according to claim 1, wherein said first director unit is one of a first plurality of director units said switching unit comprises which are adapted to be concurrently illuminated by both said first optical signal and said second optical signal and to use said illumination of said first plurality of director units by said first optical signal to direct said first optical signal to said first output path, and wherein said second director unit is one of a second plurality of director units said switching unit comprises which are adapted to be concurrently illuminated by both said first optical signal and said second optical signal and to use said illumination of said second plurality of director units by said second optical signal to direct said second optical signal to said second output path, and wherein said first plurality of director units are spatially interleaved with said second plurality of director units, and wherein said first plurality of director units do not enable said concurrent illumination of said second plurality of director units and said second plurality of director units do not enable said concurrent illumination of said first plurality of director units.

4. The wavelength selective switching device according to claim 3, wherein said second plurality of director units are adapted to direct said first optical signal to a third output path different from said first output path and said second output path, wherein said wavelength selective switching device is adapted to selectively deactivate said third output path.

5. A reconfigurable optical add/drop multiplexer device comprising a wavelength selective switching device, said wavelength selective switching device comprising:
a plurality of input paths for receiving optical signals;
a plurality of output paths for emitting said optical signals; and
a switching unit for selectively directing said optical signals from said input paths to said output paths;
wherein said switching unit comprises at least a first director unit and a second director unit;

wherein each of said first director unit and said second director unit is adapted to be concurrently illuminated by both a first optical signal and a second optical signal, said first optical signal being from a first input path among said plurality of input paths and said second optical signal being from a second input path among said plurality of input paths, said second input path being different from said first input path;

wherein said first director unit does not enable said concurrent illumination of said second director unit and said second director unit does not enable said concurrent illumination of said first director unit;

wherein said first director unit and said second director unit are adapted to use said concurrent illumination of said first director unit and said second director unit to concurrently direct said first optical signal to a first output path among said plurality of output paths and said second optical signal to a second output path among said plurality of output paths, said second output path being different from said first output path;

wherein said first output path and said second output path are spatially separated according to one of:
said first output path and said second output path are spatially separated by said first input path and said second input path;
said first input path and said second input path are spatially separated by said first output path and said second output path.

6. The reconfigurable optical add/drop multiplexer device according to claim 5, further comprising at least one of:
a first input port that corresponds to said first input path and a second input port that corresponds to said second input path;
a first drop port that corresponds to said first output path and a second drop port that corresponds to said second output path.

7. The reconfigurable optical add/drop multiplexer device according to claim 5, further comprising a plurality of wavelength selective switching devices wherein a first wavelength selective switching device among said plurality of wavelength selective switching devices comprises:
a first input path corresponding to an add port;
a second input path adapted to be optically coupled to a transmission path; and
a first output path optically coupled to an input path of a second wavelength selective switching device among said plurality of wavelength selective switching devices.

8. The reconfigurable optical add/drop multiplexer device according to claim 7, wherein said second wavelength selective switching device comprises an output path corresponding to a drop port.

9. The reconfigurable optical add/drop multiplexer device according to claim 5, further comprising a plurality of wavelength selective switching devices wherein a first wavelength selective switching device among said plurality of wavelength selective switching devices comprises:
a first input path adapted to be optically coupled to a first transmission path;
a second input path adapted to be optically coupled to a second transmission path; and
a first output path optically coupled to an input path of a second wavelength selective switching device among said plurality of wavelength selective switching devices.

10. A method for wavelength selective switching, comprising:

receiving a first optical signal at a first input path and a second optical signal at a second input path different from said first input path,
illuminating each of at least a first director unit and a second director unit concurrently with both said first optical signal and said second optical signal, wherein said first director unit does not enable said concurrent illumination of said second director unit and said second director unit does not enable said concurrent illumination of said first director unit; and
controlling said first director unit and said second director unit to, using said concurrent illumination of said first director unit and said second director unit, concurrently direct said first optical signal from said first director unit to a first output path and said second optical signal from said second director unit to a second output path different from said first output path;
wherein said first output path and said second output path are spatially separated according to one of:
said first output path and said second output path are spatially separated by said first input path and said second input path;
said first input path and said second input path are spatially separated by said first output path and said second output path.

11. The method according to claim 10, wherein said first output path and said second output path are spatially disposed according to one of:
said first output path and said second output path sandwich said first input path and said second input path along a linear array formed by said first output path, said second output path, said first input path, and said second input path;
said first input path and said second input path sandwich said first output path and said second output path along a linear array formed by said first output path, said second output path, said first input path, and said second input path.

12. The method according to claim 10, wherein said first optical signal received at said first input path is a first optical signal to be added to a first wavelength division multiplexed signal, and said second optical signal received at said second input path is a second optical signal to be added to a second wavelength division multiplexed signal.

13. The method according to claim 10, wherein said first optical signal received at said first input path is a first optical signal to be added to a first wavelength division multiplexed signal, and said second optical signal received at said second input path is received from a first optical transmission path, and said method further comprising a step of transmitting in a second optical transmission path at least one of said first optical signal and said second optical signal.

14. A non-transitory computer-readable medium encoded with a computer program comprising computer-readable instructions that, when executed by a programmable processor, implement a method comprising:
receiving a first optical signal at a first input path and a second optical signal at a second input path different from said first input path;
illuminating each of at least a first director unit and a second director unit concurrently with both said first optical signal and said second optical signal, wherein said first director unit does not enable said concurrent illumination of said second director unit and said second director unit does not enable said concurrent illumination of said first director unit; and controlling said first director unit and said second director unit to, using said concurrent illumination of said first director unit and said second director unit, concurrently direct said first optical signal from said first director unit to a first output path and said second optical signal from said second director unit to a second output path different from said first output path;

wherein said first output path and said second output path are spatially separated according to one of:
said first output path and said second output path are spatially separated by said first input path and said second input path;
said first input path and said second input path are spatially separated by said first output path and said second output path.

15. The non-transitory computer-readable medium encoded with the computer program of claim 14, wherein said first output path and said second output path are spatially disposed according to one of:
said first output path and said second output path sandwich said first input path and said second input path along a linear array formed by said first output path, said second output path, said first input path, and said second input path;
said first input path and said second input path sandwich said first output path and said second output path along a linear array formed by said first output path, said second output path, said first input path, and said second input path.

16. The non-transitory computer-readable medium encoded with the computer program of claim 14, wherein said first optical signal received at said first input path is a first optical signal to be added to a first wavelength division multiplexed signal, and said second optical signal received at said second input path is a second optical signal to be added to a second wavelength division multiplexed signal.

17. The non-transitory computer-readable medium encoded with the computer program of claim 14, wherein said first optical signal received at said first input path is a first optical signal to be added to a first wavelength division multiplexed signal, and said second optical signal received at said second input path is received from a first optical transmission path, and said method further comprising a step of transmitting in a second optical transmission path at least one of said first optical signal and said second optical signal.

* * * * *